A. R. ANGUS.
RAILWAY SAFE RUNNING DEVICE.
APPLICATION FILED MAR. 20, 1913.
1,415,214.
Patented May 9, 1922.
18 SHEETS—SHEET 1.
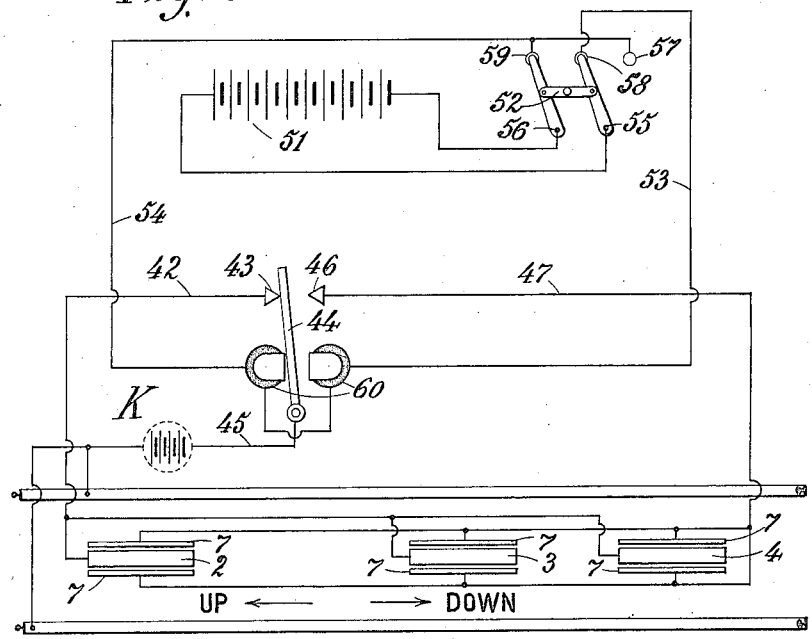
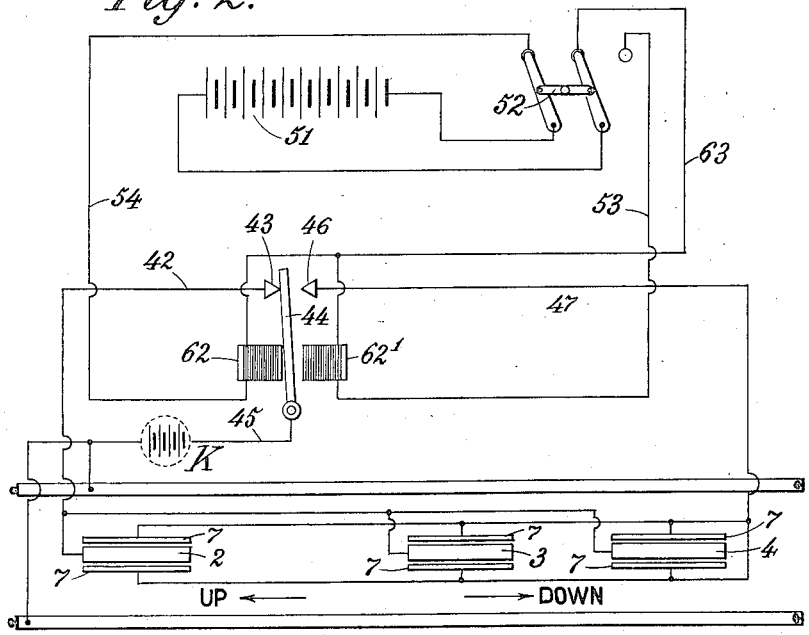

A. R. ANGUS.
RAILWAY SAFE RUNNING DEVICE.
APPLICATION FILED MAR. 20, 1913.

1,415,214.

Patented May 9, 1922.
18 SHEETS—SHEET 2.

A. R. ANGUS.
RAILWAY SAFE RUNNING DEVICE.
APPLICATION FILED MAR. 20, 1913.

1,415,214.

Patented May 9, 1922.
18 SHEETS—SHEET 3.

A. R. ANGUS.
RAILWAY SAFE RUNNING DEVICE.
APPLICATION FILED MAR. 20, 1913.

1,415,214.                                     Patented May 9, 1922.
                                                    18 SHEETS—SHEET 7.

A. R. ANGUS.
RAILWAY SAFE RUNNING DEVICE.
APPLICATION FILED MAR. 20, 1913.

1,415,214.

Patented May 9, 1922.
18 SHEETS—SHEET 8.

A. R. ANGUS.
RAILWAY SAFE RUNNING DEVICE.
APPLICATION FILED MAR. 20, 1913.

1,415,214.

Patented May 9, 1922.
18 SHEETS—SHEET 9.

A. R. ANGUS.
RAILWAY SAFE RUNNING DEVICE.
APPLICATION FILED MAR. 20, 1913.
1,415,214.
Patented May 9, 1922.
18 SHEETS—SHEET 11.
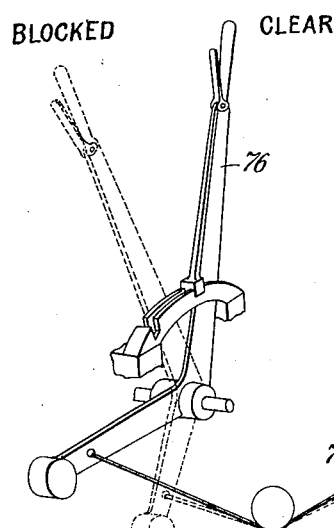
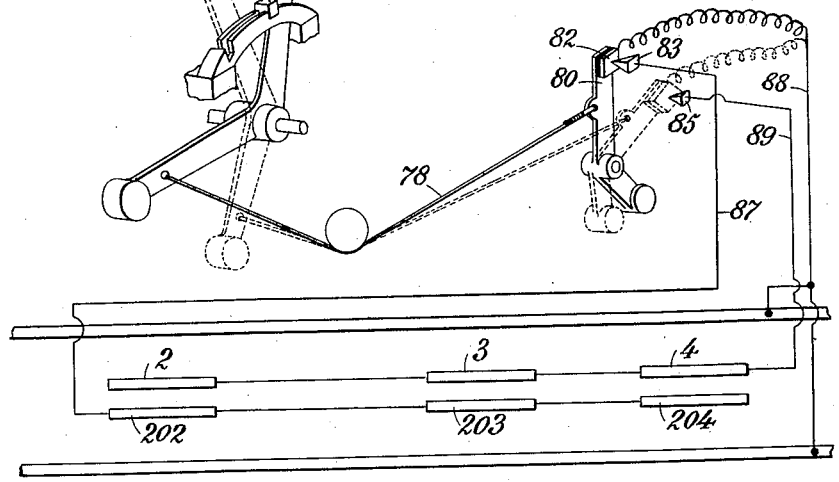
Fig. 18.
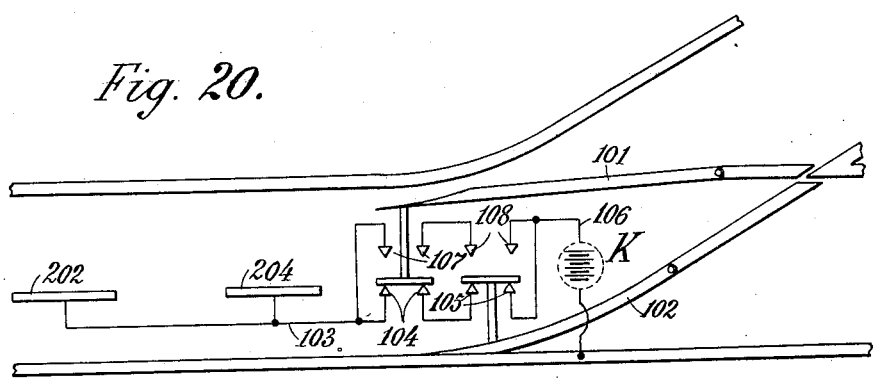
Fig. 20.

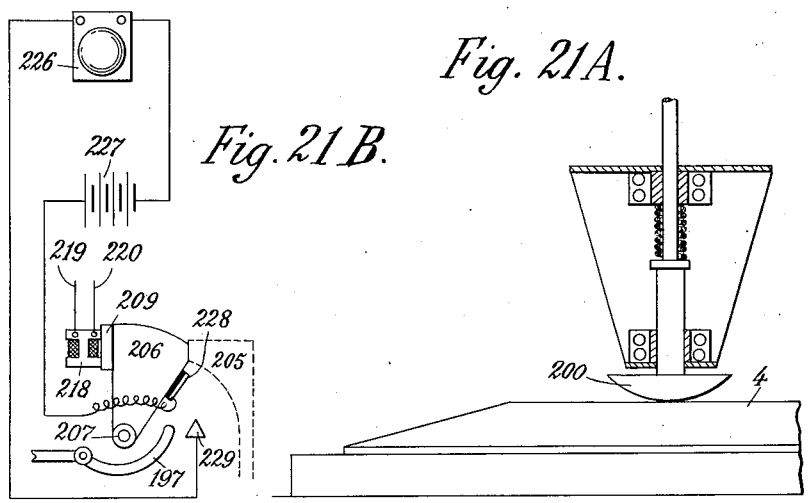
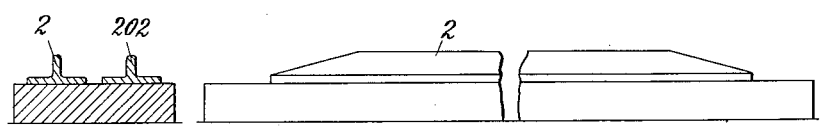
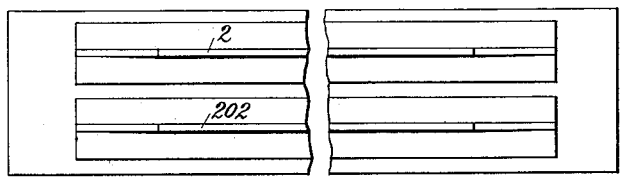
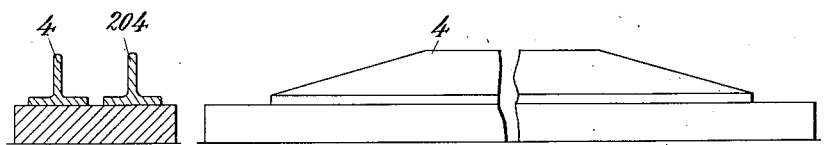
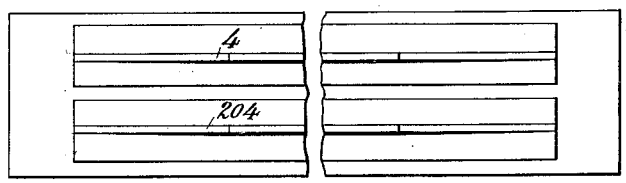

A. R. ANGUS.
RAILWAY SAFE RUNNING DEVICE.
APPLICATION FILED MAR. 20, 1913.

1,415,214.

Patented May 9, 1922.
18 SHEETS—SHEET 17.

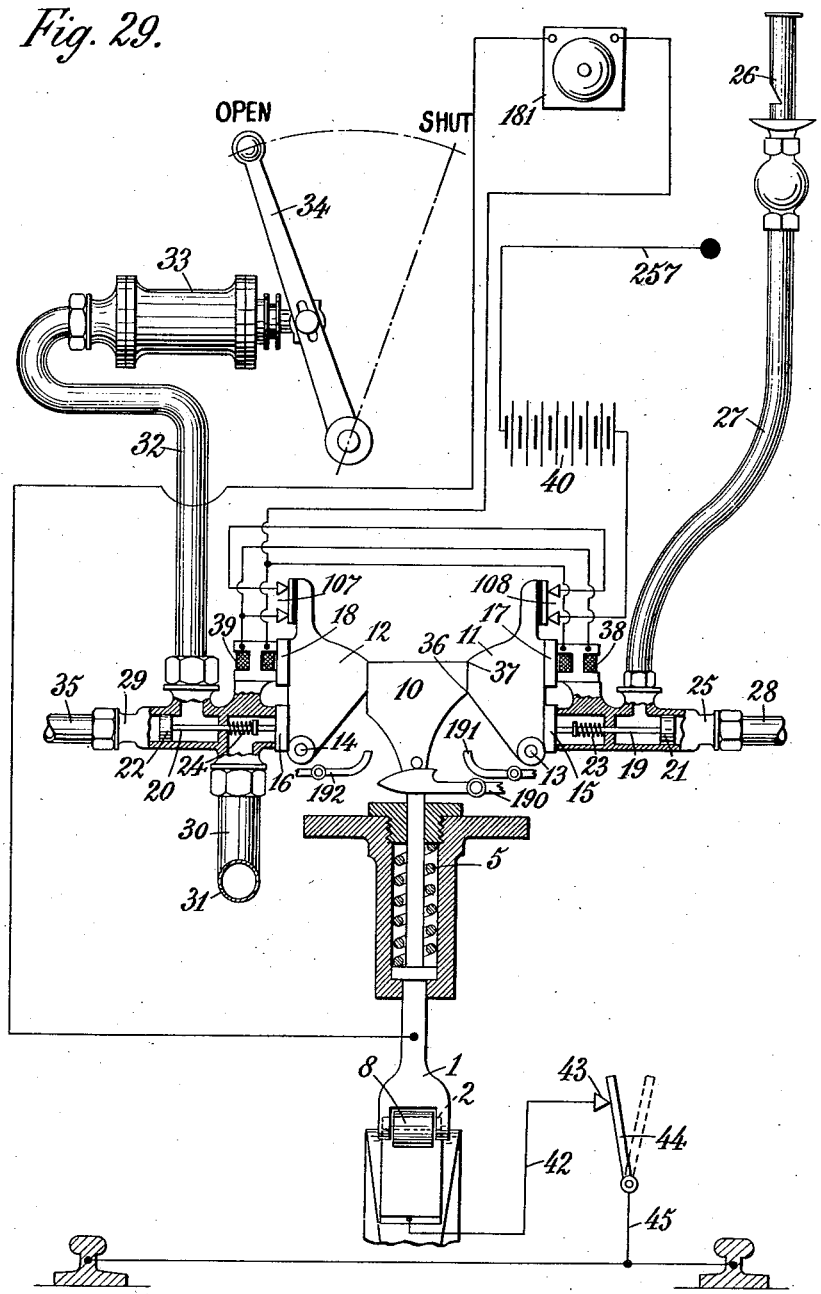

UNITED STATES PATENT OFFICE.

ARTHUR REGINALD ANGUS, OF MINEHEAD, ENGLAND.

RAILWAY SAFE-RUNNING DEVICE.

1,415,214.                  Specification of Letters Patent.       Patented May 9, 1922.

Application filed March 20, 1913. Serial No. 755,686.

(GRANTED UNDER THE PROVISIONS OF THE ACT OF MARCH 3, 1921, 41 STAT. L., 1313.)

*To all whom it may concern:*

Be it known that I, ARTHUR REGINALD ANGUS, a subject of the King of Great Britain and Ireland, and a resident of Minehead, in the county of Somerset, England, have invented certain new and useful Improvements in or Relating to Railway Safe-Running Devices, of which the following is a specification.

The invention forming the subject-matter of the present application relates to train protecting apparatus comprising train apparatus and track apparatus of the type in which an indication of the condition of the track is given on a train when the train makes contact with a track contact unless a restraining influence is simultaneously brought to bear on the indicating apparatus.

In apparatus according to this invention, a single contacting device on a train adapted to come into contact with track contacts normally restrains non-electrically the operation of a warning or stopping device or warning and stopping devices on the train and according to the nature of the track contact with which the contacting device comes into contact the restraint by the contacting device of the warning or stopping device or the warning and stopping devices is removed and it or they come into operation unless a substitutional restraining influence is brought to bear. The restraint of the warning or stopping device or the warning and stopping devices which is effected by the contacting device is removed whenever the contacting device is displaced from the position wherein it effects the said restraint.

Apparatus according to this invention is such that a warning or a stopping operation is produced unless a restraining element, which constantly tends to allow the operation to be effected, is held in its restraining position either by a contacting device which normally so holds it, and is adapted, whenever it comes into contact with a track contact, to be thereby so displaced as to lose its restraining action on the restraining element, or by a substitutional restraining influence.

In another example of apparatus according to this invention, a line-clear intimation is given on a train unless a restraining element which constantly tends to allow the line-clear intimation to be given, is held in its restraining position either by a contacting device which normally so holds it and is adapted, whenever it comes into contact with a track contact to be thereby so displaced as to lose its restraining action on the restraining element, or by a substantial restraining influence.

Apparatus according to this invention is further so constructed that when a contacting device on a train comes successively into contact with two track contacts, it successively releases two restraining elements (which constantly tend to allow these operations to be effected and which are normally held in their restraining positions by the contacting device) and thereby brings about successively a warning operation and a stopping operation unless, when the train is in contact with each of the track contacts, a substitutional restraining influence is brought to bear.

In apparatus according to this invention the substitutional restraining influence is brought to bear on the indicating means by tracks contacts that are arranged in pairs and so connected that when one contact of a pair can effect the production of the restraining influence, the other track contact of the pair cannot do so. In certain cases the two contacts of a pair correspond to the two opposite directions of travel, and in other cases the two contacts of a pair are adapted to give line-clear indications and danger intimations respectively.

The various features of the invention are hereinafter set out in the claims appended hereto and the invention is illustrated by the accompanying drawings, which represent by way of example apparatus constructed and arranged in accordance therewith:—

Figs. 1 to 14 inclusive represent a mode of carrying out this invention wherein the track contacts are adapted to be at the same time operative for one direction of travel and inoperative for the other direction of travel, the apparatus on the train being adapted to have a line-clear intimation given by the restraining current, and Figs. 15 to 28 inclusive represent a mode of carrying out this invention wherein pairs of track contacts are used such that one of each pair is adapted to produce a line-clear intimation on a train, a warning or a stopping operation being restrained at the same time, whilst the other of the pair is adapted to produce a warning or a stopping operation, the production of a line-clear intimation being restrained at the same time.

In particular:

Figs. 1 and 15 represent apparatus at one end of a section of track, and show electrical means for affecting track contacts wherein a polarized relay is employed.

Figs. 2 and 16 show electrical means for affecting contacts wherein a non-polarized relay is employed.

Figs. 4 and 18 represent non-electrical means for affecting track contacts wherein switches are operated indirectly through wires (Fig. 4) or a wire (Fig. 18) the arrangement of the levers and wires of Fig. 4 being interchangeable with the arrangement of the lever and wire of Fig. 18.

Figs. 6 and 20 represent means whereby track contacts are affected by points.

Figure 10:
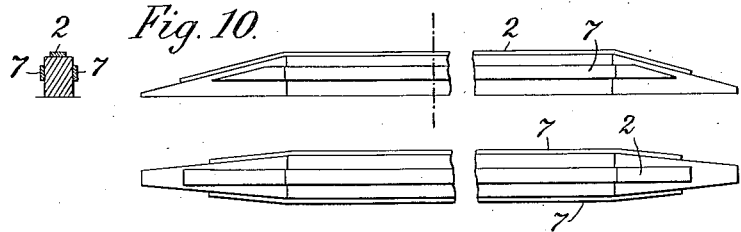

Figs. 10 and 24 each shows an elevation, a plan, and a cross-section of a signal contact.

Figure 11:
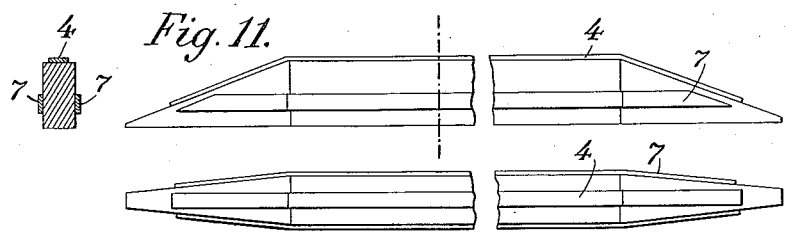

Figs. 11 and 25 each shows an elevation, a plan, and a cross-section of a stop contact.

Figure 12:
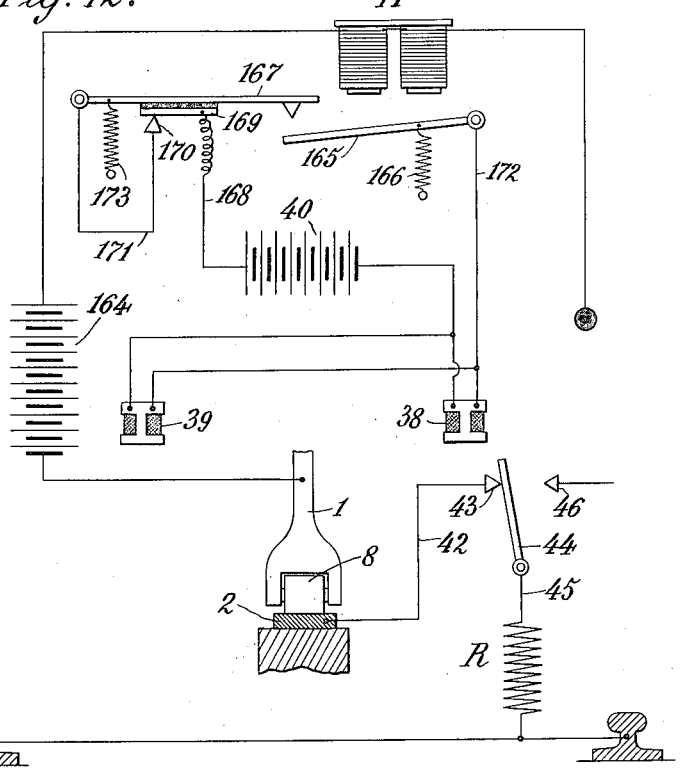
Figure 26:
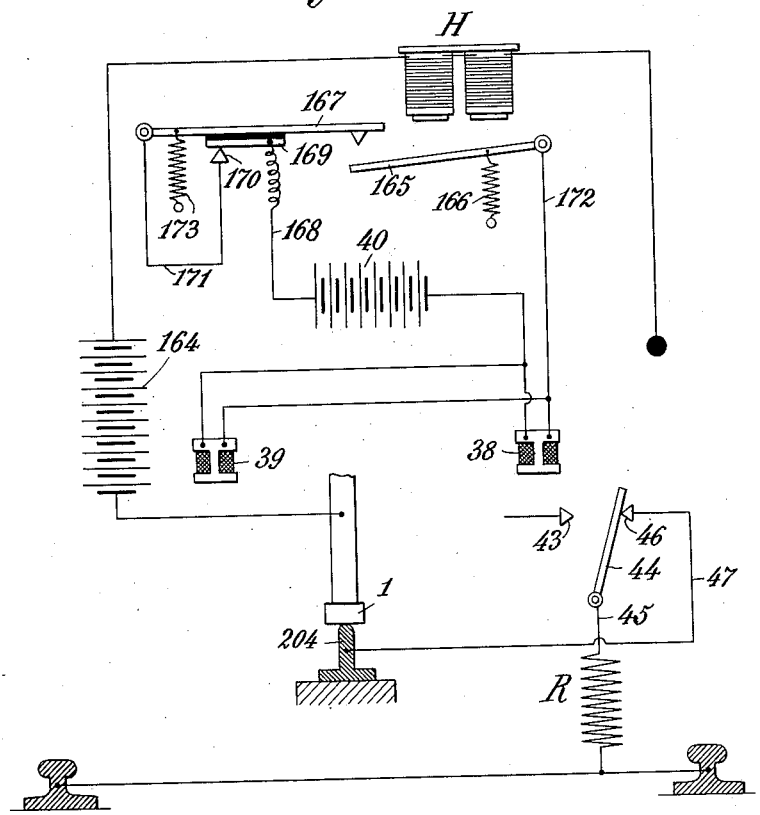

Figs. 12 and 26 represent a modification of train apparatus wherein a restraining current is relayed in by the current passing through track contacts.

Figure 13:
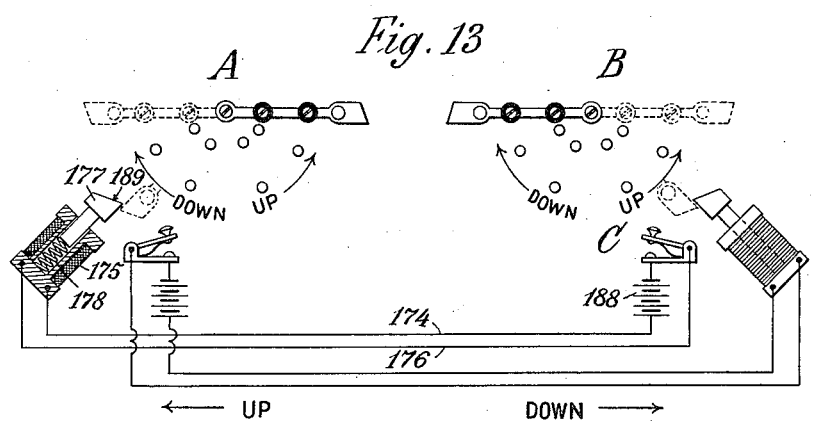
Figure 27:
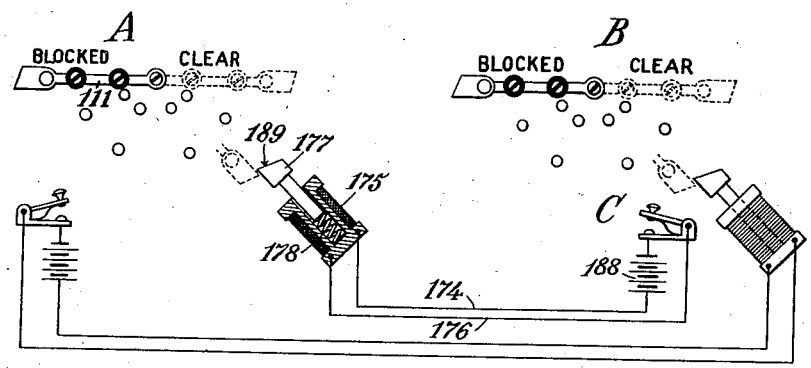

Figs. 13 and 27 are diagrammatic representations of apparatus at the signal stations at the two ends of a section, whereby the signalman at one station is enabled to unlock the switch at the other station so as to give the signalman at the other station permission to allow a train to enter the section at his end.

Figure 14:
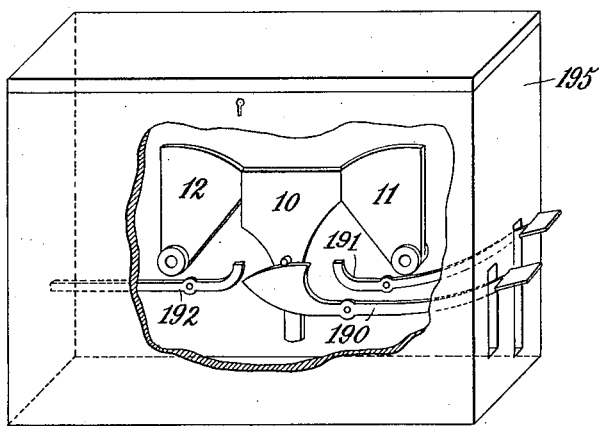
Figure 28:
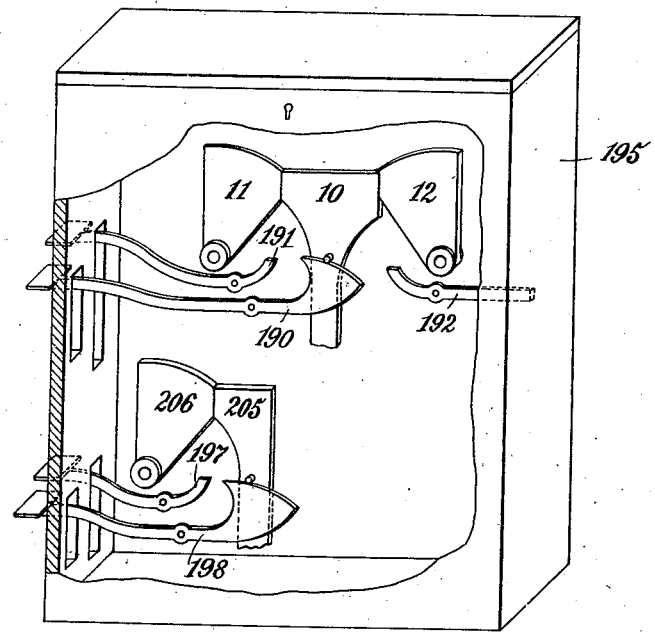

Figs. 14 and 28 represent a box which is kept locked and which, whilst allowing the driver of a warned train to stop the warning and reset the train apparatus prevents him from restarting the train after it has been automatically stopped.

Figure 21:
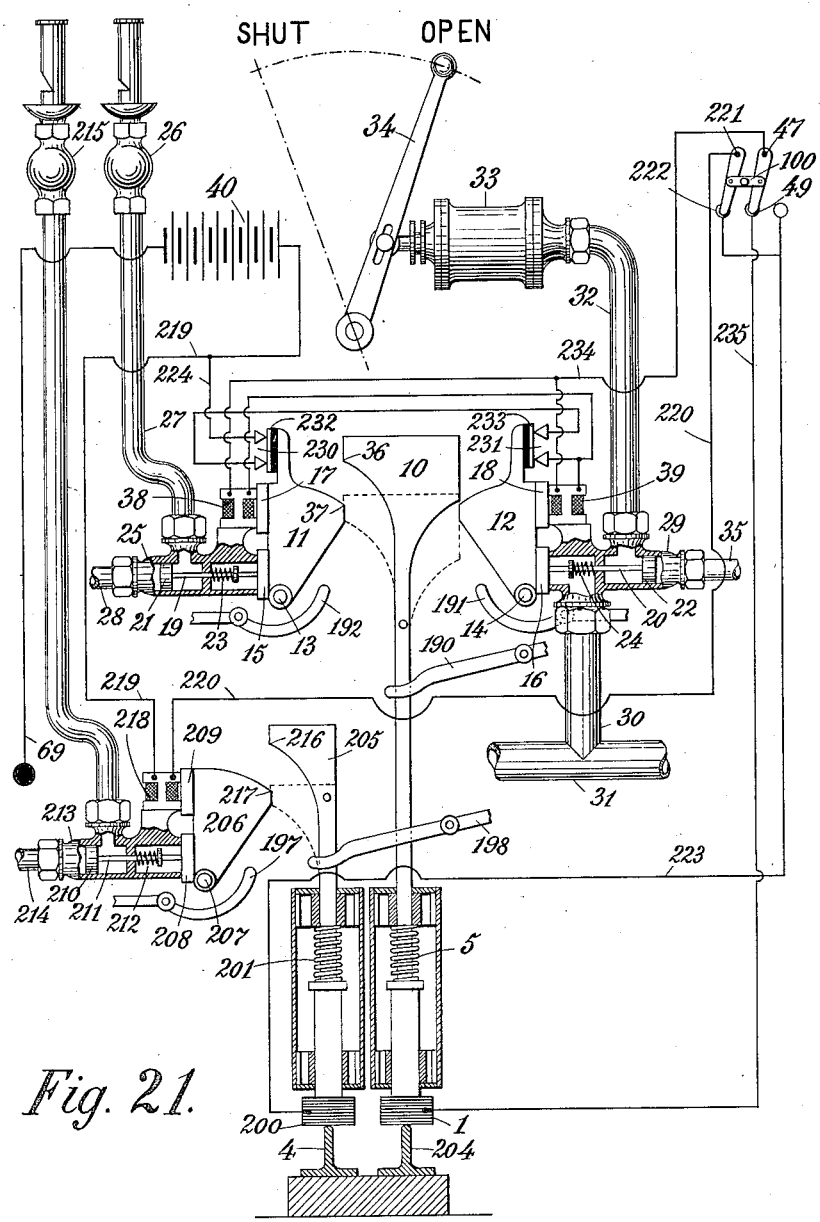

Fig. 21$^A$ shows a contacting shoe in contact with a track contact.

Fig. 21$^B$ shows a method of giving the line-clear signal by the ringing of a bell or buzzer on removal of restraint by a line-clear track contact used in apparatus according to Figs. 15 to 28 inclusive.

Figure 7:
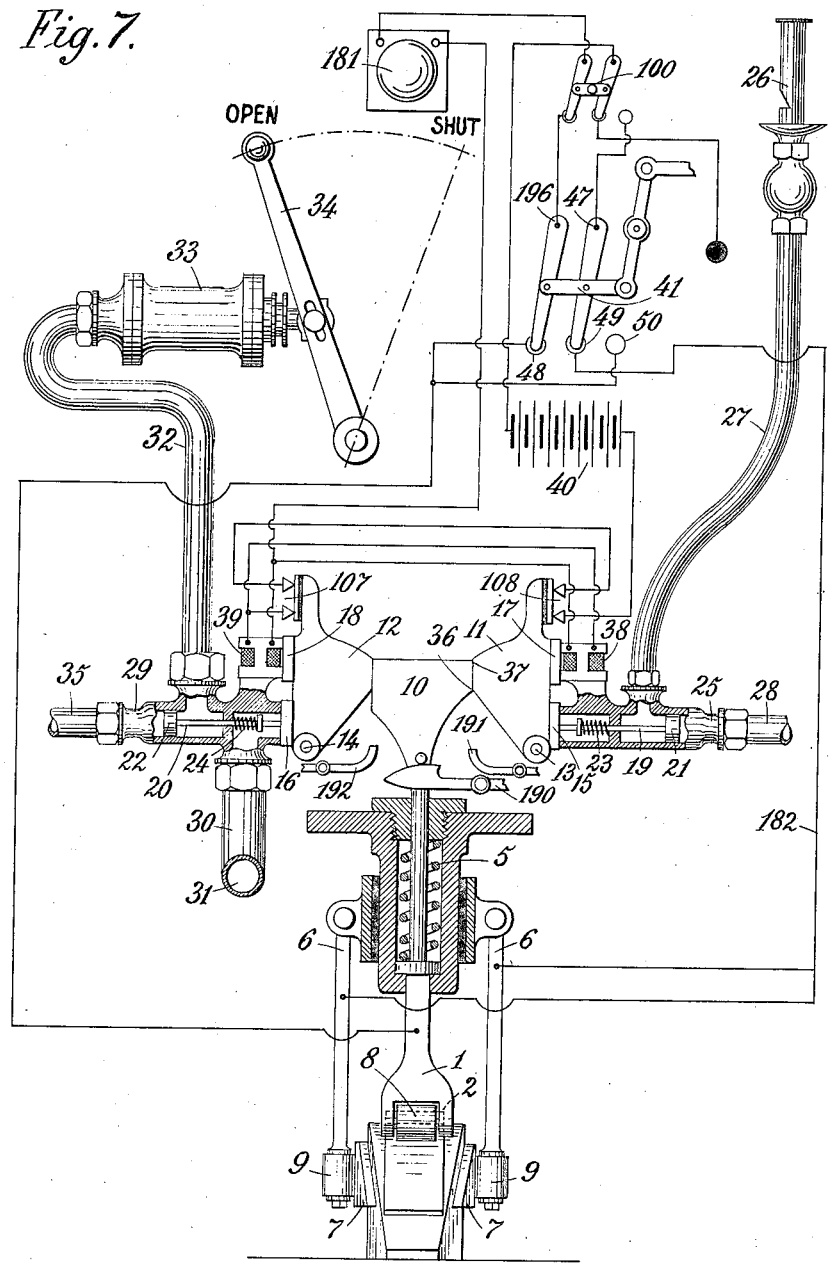
Figs. 7 and 21 represent diagrammatically the apparatus on a train.

Fig. 29 shows how the apparatus shown in Fig. 7 and the track apparatus for use therewith may be modified when trains are only required to run in one direction along a track, a single contact device only on the train being employed.

At the two ends of a section of track respectively I place two series of track contacts arranged reversely as to order. Each series of track contacts comprises signal contacts and a stop contact, the stop contact being preferably adapted to move a contacting device on a train to a greater extent than a signal contact. Each track contact employed in connexion with apparatus such as is shown in Figs. 1 to 14 inclusive has a top ramped contact 2, 3, or 4 and two sides ramped contacts 7, 7 respectively consisting of plates or the like of some electrically conducting material (Figs. 10 and 11). The track contacts constructed in accordance with apparatus shown in Figs. 1 to 14 inclusive will be designated in the following manner:—

The signal contacts adapted to produce a warning and repeated warning respectively will hereinafter have the designation of their respective top contacts 2 and 3 and the stop contact will have the designation of the top contact 4.

Figure 6:
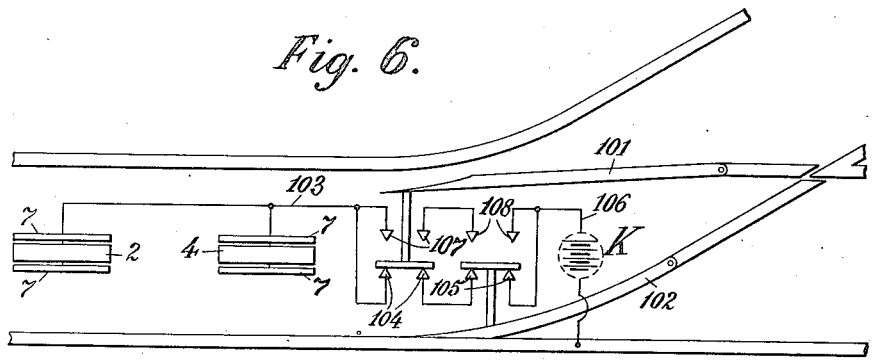

In all cases except in the cases shown in Figs. 6 and 20, a warning followed by a repeated warning is given before the train is automatically stopped, but the warning may be repeated as often as desired by multiplying the number of track contacts.

The following is a description of the apparatus constructed according to Figs. 1 to 14 inclusive, and its operation.

The shoe 1 (Fig. 7) is attached to and insulated from any suitable part of a locomotive or brakevan or other suitable vehicle and is adapted to be moved or displaced to varying extents when interacting with track contacts such as 2, 3, and 4 (Fig. 1, etc.) placed on or about or above the railway track and when not in interaction with the track contacts is returned to its lowest or normal position by a spring 5, acting on it in addition to gravity, though it may be held in the normal position by one or more springs only or by gravity only. Side arms 6, 6 attached to but insulated from the shoe 1, are adapted to interact with the side contacts 7, 7 towards which they are pressed by springs (not shown). The side contacts 7, 7 and top contacts 2, 3, and 4 are mounted on some suitable non-conducting material such as wood or the like and the side contacts 7, 7 are connected together electrically and insulated from the top contacts.

The shoe 1 and side arms 6, 6 are preferably provided with suitable rollers 8 and 9, 9 for effecting contact with the aforesaid top contacts 2, 3, and 4 and side contacts 7, 7 respectively. Part 10 of the shoe 1 is adapted to restrain mechanically or hold in their normal positions sector-shaped pieces 11 and 12, pivoted about 13 and 14 respectively.

To the sectors 11 and 12 are attached doors or the like 15 and 16 and armatures 17 and 18 respectively.

Against these doors 15 and 16 press piston rods 19 and 20 behind the pistons 21 and 22 of which is suitable fluid pressure as that of steam, air, or gas, tending to move or push out the pistons 21 and 22, and in addition there are springs 23 and 24 on the piston rods 19 and 20 also tending to push the piston rods 19 and 20 out and thus open the doors 15 and 16. In addition to these forces acting on the doors tending to open them there is also the weight of the sectors which would alone be sufficient to cause them to fall or be moved unless restrained by some part, such as 10 of the shoe 1. The springs 23 and 24 might in some cases be omitted.

The shoe 1 is arranged so that if it becomes displaced from its normal position its relative doors or sectors will be moved so as to produce on the train a warning or a stopping operation, or both.

The cylinder 25 consists of one compartment which is connected with the danger whistle 26 by a pipe 27 and is also connected by a pipe 28 with a source of suitable fluid pressure as that of steam, air, or gas. Normally this fluid pressure is cut off from the danger whistle 26 by the piston 21 which is pushed into the position shown in the figure by the door 15. When the door 15 falls or moves, the piston 21 is moved or forced out by the fluid pressure behind it and by the spring 23, communication is made to the pipe 27, and the danger whistle 26 is blown until the door 15 is replaced.

The cylinder 29 is composed of two separate compartments, one of which is connected by a large pipe 30 with the train pipe 31 of the fluid pressure brakes and the other is connected by a pipe 32 with the cylinder 33, in which is a piston whose piston rod is connected directly or through a link with the driver's handle 34.

The end of the cylinder near the door 16 is quite open to atmosphere when not blocked up by the door 16, and when this door 16 moves or falls the train pipe 31 is connected directly to atmosphere and the application of the brakes is effected.

The other compartment is connected by a pipe 35 with a source of fluid pressure such as aforesaid, and normally this fluid pressure is cut off from the cylinder 33 by the piston 22, which is pushed into the position shown in the figure by the door 16. When the door 16 falls or moves sufficiently, the piston 22 is moved or forced out by the fluid pressure behind it and also by the spring 24, communication is made with the pipe 32 and the cylinder 33, and the driver's lever is forced over to the shut or off position.

When the locomotive interacts with a signal contact comprising a top contact 2 or 3, and side contacts 7, 7 the shoe 1 is lifted or moved to such an extent that the point 36 of the part 10 is raised or moved clear of the point 37 of the sector 11, the sector 11 unless otherwise restrained, will at once fall or move carrying with it the door 15, and the danger whistle 26 will be blown until the door 15 is replaced in the position shown in the figure. It will be seen that while interacting with a signal contact 2 or 3, the sector 12 will not fall or be moved because the contacting face of the part 10 which engages with the sector 12 is longer than the contacting face which engages with the sector 11. When the locomotive interacts with a stop contact comprising top contact 4 and side contacts 7, 7, the shoe 1 is moved or displaced to a greater extent than when the locomotive interacts with a contact 2 or 3, and the part 10 is lifted or moved clear of both sectors 11 and 12. These will at once move or fall, carrying with them the doors 15 and 16 unless otherwise restrained, when the danger whistle will be blown, brakes will be applied, and the motive power of the train will be cut off.

These operations will be performed when a locomotive interacts with contacts 2, 3, and 4, which are at the time not connected to the rails, or when the current passing through the coils 38 and 39 is insufficient to hold the armatures 17 and 18 respectively.

The sectors 11 and 12 may be returned to their normal positions shown in the drawings by suitable levers (Fig. 14).

When a train interacts with a track contact which has been connected to the rails current will flow (in the case wherein the electrical source is on the train) from the generator 40, shown in the drawings on the locomotive or train, through contacts 108 and 107 to the coils 39 and 38 and the bell or buzzer 181, thence by the commutator switch 100 and reversing switch 41 (adapted to be operated by the reversing lever of the locomotive) either directly to the shoe 1 and a top contact 2, 3, or 4, or to the side arms 6, 6 and the side contacts 7, 7 according to the positions of the reversing switch 41, the commutator switch 100, and the armature 44 of the track relay. With the reversing switch 41 and the commutator switch 100 in the position shown in Fig. 7, current will flow through the arm 196 and contact 48 to the shoe 1 and the top contact, 2, 3, or 4, thence by wire 42 (Figs. 1 and 2) to contact 43 and armature 44, when the said armature 44 is in the position shown in the drawings, thence by wire 45 to rails and back to the generator 40 by the wheels and frame of the locomotive and the commutator switch 100.

The coils 38 and 39 are wound on iron cores firmly attached to the cylinders 25 and 29, and the armatures 17 and 18 of these electromagnets are firmly attached to the sectors 11 and 12. These coils 38 and 39, when sufficiently energized, hold the sectors 11 and 12 in the positions shown in the drawings even after the part 10 is moved quite enough to fail to support them.

When the reversing switch 41 and the commutator switch 100 are in the positions shown in Fig. 7—that is to say, set for the down journey, which is indicated in Fig. 1—and the armature 44 is set in the position for the down journey as shown in Fig. 1, the circuit through a top contact 2, 3, or 4, and the rails will be completed as described above through the contact 43. A locomotive running on the down journey when the armature 44 is set for the down journey will obtain clearance on track contacts 2, 3, and 4 because its coils 38 and 39 are energized and restrain the sectors 11 and 12 from falling. The current flowing through the coils 38 and 39 will cause the line-clear bell or buzzer 181 to sound whilst contact is being made with a track contact. The line-clear bell or buzzer 181 if required may, however, be adapted to continue sounding after passing over a track contact until restrained.

When the road is made for the up journey, the armature 44 (Figs. 1 and 2) will make contact with the contact 46, thereby connecting the side contacts 7, 7 with the rails and disconnecting the top contacts 2, 3, and 4 from the rails at contact 43. Thus a locomotive with its commutator switch 100 and reversing switch 41 in the positions shown in Fig. 7 (that is, running on the down journey) on interacting with track contacts 2, 3, and 4, when the road has been made for the up journey, will have neither the circuit through the top contacts nor the circuit through the side contacts completed.

On interacting therefore with the track contact 2, the shoe 1 will be lifted or moved to such an extent that the point 36 will be moved clear of the point 37 of the sector 11. The sector 11 will then be moved by, the pressure of steam or other suitable fluid pressure acting behind piston 21, the spring 23, and gravity, and communication will be made between the pipe 28 and the danger whistle 26 which will be blown. On interacting with the track contact 3, the shoe 1 will be displaced to the same extent as on track contact 2, and the danger whistle will again be blown. On interacting with track contact 4, the shoe 1 will be displaced to such an extent that both sectors 11 and 12 will fall so that the danger whistle 26 will be blown, steam will be admitted to the piston 33 from pipe 35 and close the driver's regulator 34, and the train pipe 31 will be opened to the atmosphere and the brakes applied.

When the armature 44 contacts with contact 46 (that is, when the up road is made) and the reversing switch 41 is moved over to make contact with contacts 49 and 50 and the commutator switch is in the position shown in Fig. 7 (that is, when the locomotive is running on the up journey), the circuit of the generator 40 will be completed through the contacts 108 and 107, the coils 39 and 38, the line-clear bell or buzzer 181, the commutator switch 100, the arm 196 and contact 49, wire 182, the side arms 6, 6, the side contacts 7, 7, the wire 47, contact 46, armature 44, wire 45, the rails, the frame of the locomotive and commutator switch 100. The danger whistle 26 is thus restrained form blowing, the motive power of the train from being shut off, and the brakes from being applied. At the same time the line-clear bell or buzzer 181 is sounded, or a miniature signal on the train is operated in the known manner, or both a line-clear bell or buzzer and a miniature signal are operated.

It will be seen that the stopping operation above described would be produced also if the contacting device should move downward out of contact with the sectors 11 and 12, as it would if the contacting device were to fall off the train or were broken in such a way as to allow the part 10 to fall out of contact with the sectors.

From the foregoing description it is evident that a locomotive running on the up journey cannot without having corresponding warning or stopping operations performed upon it pass over track contacts which have been electrically connected to the rails for the down journey nor can a locomotive running on the down journey pass over the track contacts which have been electrically connected to the rails for the up journey.

When the locomotive is turned upon a turntable, triangle, or the like, the commutator switch 100 must be operated to enable it to obtain clearance on the track contacts. Track contacts should be placed adjacent to the turntable or the like and so connected that unless the driver has duly operated his commutator switch so as to complete the required circuits for the next journey of the train, the train will be warned or stopped or both, as herein indicated.

The generator 40 is shown in the drawings on the locomotive, but it is intended that where desired track batteries or generators (marked K in the drawings) may be used instead of a generator on the train.

Although in the drawings there are shown two side contacting devices 6, 6, it is obvious that where, as shown, there are two side contacts 7, 7, for each compound track contact 2, 3, or 4, a single side contacting device 6, may be employed and conversely where as shown there are two contacting devices 6, 6 there may be only one side contact 7 for each of the compound track contacts 2, 3, and 4.

In Fig. 1, a polarized relay or similar switching apparatus is shown which is preferably placed adjacent to the track contacts at one end of a section and is adapted either to connect or to disconnect these track contacts to or from the rails either for the up or down journey as herein described, and is operated by current from the generator 51 in a distant signal box.

The reversing switch 52, operated by the signalman in the box enables him to operate the armature 44 of the switching instrument 60 through line wires 53 and 54. If desired, instead of a complete metallic circuit one wire and an earth return may be used. When the reversing switch 52 is in the position shown in Fig. 1, current passes from the generator 51, through arm 55 and contact 58, wire 53, the coils 60, wire 54, contacts 59 and arm 56, and back to the generator. The armature 44 under the influence of the coils 60, takes up the position shown in the figure, and the road for the down journey is made. When the reversing switch 52 is moved over to make contact with contacts 57 and 58, the current through the coils 60 will be reversed and the armature 44 will make contact with contact 46 instead of 43, and the road for the up journey will be made.

In Fig. 2, a non-polarized relay or the like switching instrument comprising coils 62 and 62' which attract the common armature 44 in opposite directions is shown placed adjacent to the track contacts 2, 3, and 4, and operated by current from a generator 51 in a distant signal box. By means of a suitable switch 52 the signalman energizes either coil 62 or 62' thus causing armature 44 to make contact with either contact 43 or 46 and thereby connects either the top or the side contacts with the rails and makes the road for the down journey or for the up journey. Line wires 53, 54, and 63 are used, but if desired two wires only and an earth return may be used instead.

Figure 3:
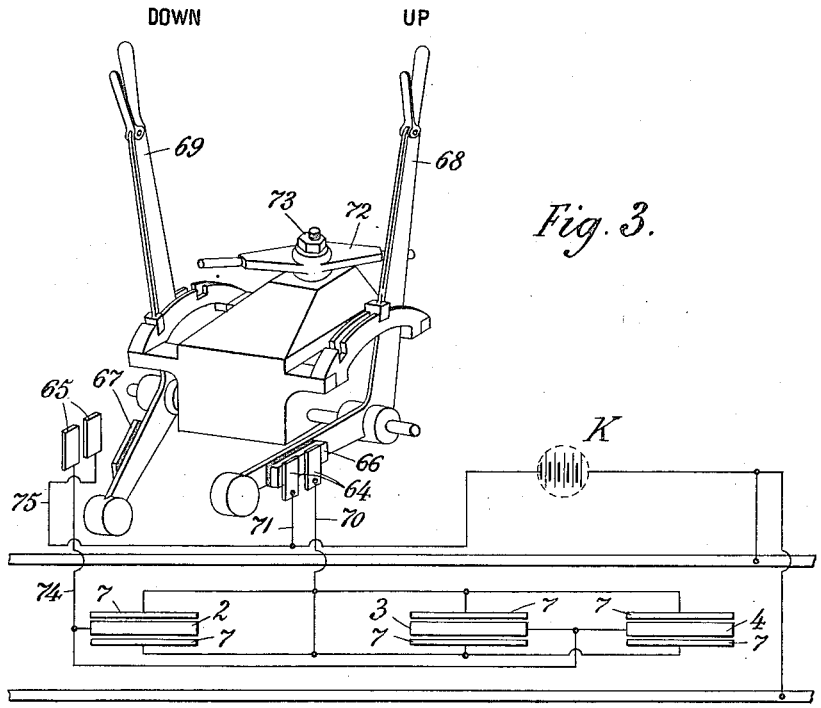
Figs. 3 and 17 represent non-electrical means for affecting track contacts wherein switches are operated directly, the interlocked levers of Fig. 3 and the single lever of Fig. 17 being interchangeable.

In Fig. 3 are shown two hand switches mutually interlocked so that only one pair of the contacts 64 and 65 at a time may be bridged by suitable contact plates 66 and 67 respectively. With the switch 68 in the position shown in the diagram, the contacts 64 are bridged by contact plate 66, the side contacts 7, 7 are connected with the rails by the wire 70, the contacts 64, and the wire 71, and the road for the up journey is made. While being moved over to the position shown, the switch handle 68 moves with it the end of a rocking bar 72 pivoted at 73, the other end of which approaches the handle of the switch 69 and prevents it from being pulled over to bridge the contacts 65 by the plate 67. Similarly, when the switch handle 69 is pulled over to make the road for the down journey, the circuit from the top contacts 2, 3, and 4, through the wire 74, the contacts 65, the plate 67, and the wire 75 to the rails is completed. The switch handle 69 moves the rocking bar 72 which approaches the switch handle 68 and prevents it from being pulled over to bridge the contacts 64 by the plate 66.

Thus it is seen that a road can be made for the up journey alone or for the down journey alone, and when the switch handles are both unlocked they will by virtue of their weighted ends take up such positions that neither the road for the up journey nor the road for the down journey is made.

Figure 4:
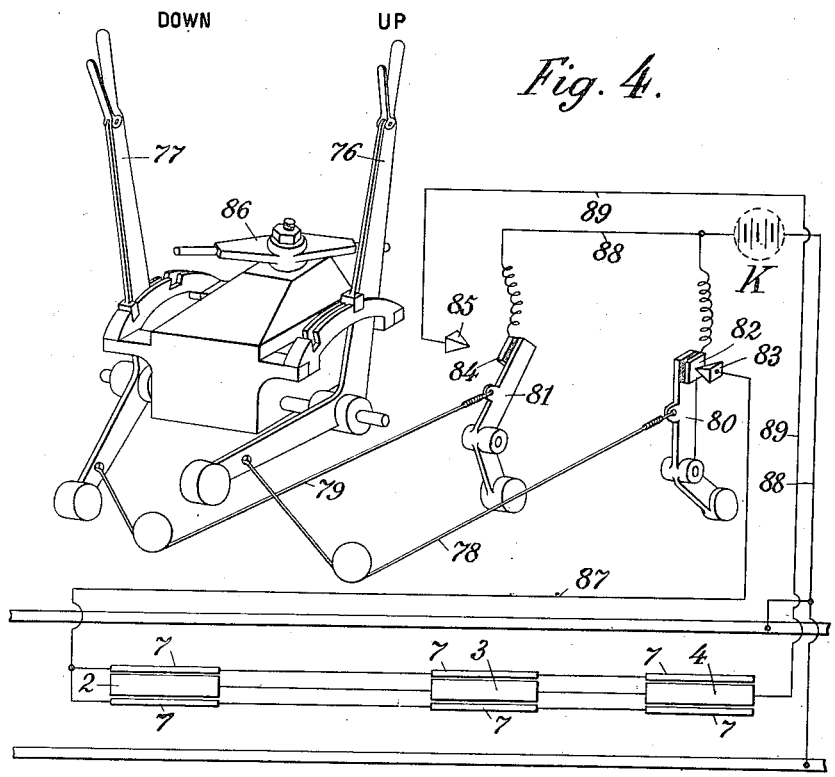

In Fig. 4 are shown two ordinary weighted levers 76 and 77, which operate by wires 78 and 79 respectively weighted switches 80 and 81 so as to effect contact between contacts 82, 83, and 84, 85, respectively. The lever 76 is shown in the figure as having been pulled over so as to close the contacts 82 and 83 and carry with it the rocking bar 86, the other end of which approaches lever 77 and prevents it from being pulled over to effect the bridging of the contacts 84 and 85. The side contacts 7, 7 are thus connected with the rails by the wire 87, contacts 83 and 82, wire 88, and the road for the up journey is made. Conversely if the lever 77 is pulled over it effects the closing of the contacts 84 and 85 and the connexion of the top contacts 2, 3, and 4 with the rails, by wire 89, contacts 85 and 84, wire 88, and the road for the down journey is made. At the same time the rocking bar 86 is moved over and prevents the lever 76 from being pulled over to effect the closing of the contacts 83 and 82 for the up journey. In the case of the normal position of the weighted levers 76 and 77 neither the contacts 82 and 83, nor the contacts 84 and 85 are bridged and the road is made neither for the up nor for the down journey. Should a wire 78 or 79 break, the weighted switch 80 or 81 would at once drop and the contacts 82 and 83 or 84 and 85 would become unbridged.

Figure 5:
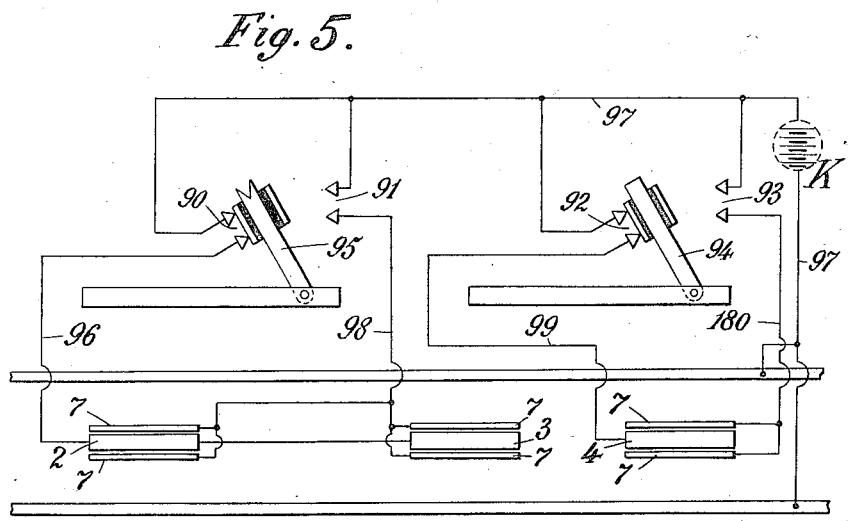
Figs. 5 and 19 represent means whereby track contacts are affected by a signal arm.

In the example shown in Fig. 5, ordinary track signals are used, on the arms of which are fixed contact plates adapted to bridge the contacts 90 and the contacts 92 and break contact with the contacts 91 and the contacts 93 when the arms 95 and 94 are in the off position as shown in the figure. The distant arm 95 controls the signal contacts 2 and 3, and the home arm 94 the stop contact 4. When the arm 95 is off as shown, the top contacts 2 and 3 are connected with the rails by the wire 96, contacts 90, wire 97, and the road for the down journey is made. On the other hand the connexion of the side contacts 7, 7 with the rails by wire 98, contacts 91, and wire 97 is broken at contacts 91, and the road for the up journey is not made. When the signal arm 94 is in the off position as shown, the top contact 4 is connected with the rails by wire 99, contacts 92, and wire 97, and the road for the down journey is made, and at the same time the connexion of the side contacts 7, 7 with the rails by wire 180, contacts 93, and wire 97, is broken at contacts 93, and the road for the up journey is not made. Thus a locomotive with its reversing switch 41 and commutator switch 100 in the positions for the down journey will obtain clearance, whereas one running on the up journey will not obtain clearance. The signal arms 94 and 95 may be operated in any known manner. The signals for the up journey at the other end of the section are also adapted to operate in the manner herein described.

Fig. 6 shows a method of point detection.

A train running on the down journey passes over contacts 2 and 4 which are signal and stop contacts respectively and unless the two blades 101 and 102 of the points are right home in the correct position either for the main or for the branch line the locomotive on interacting with contacts 2 and 4 will not complete the circuit of generator 40 through the top contacts 2 and 4 or side contacts 7, 7 respectively, and the locomotive will be warned on contact 2 and stopped on contact 4.

As shown in the figure the contacts 2, 4, and 7, 7 are all connected to a wire 103 so that the circuit is completed by wire 103 through either contacts 104 and 105 and wire 106 to the rails when the road is made for the branch line as shown, or through contacts 107 and 108 and wire 106 to the rails when the road is made for the main line. Thus a train on the down journey running towards facing points first checks the position of these facing points as it approaches them, and a train on the up journey checks that they have been left in the correct position after it has passed over them.

Figure 8:
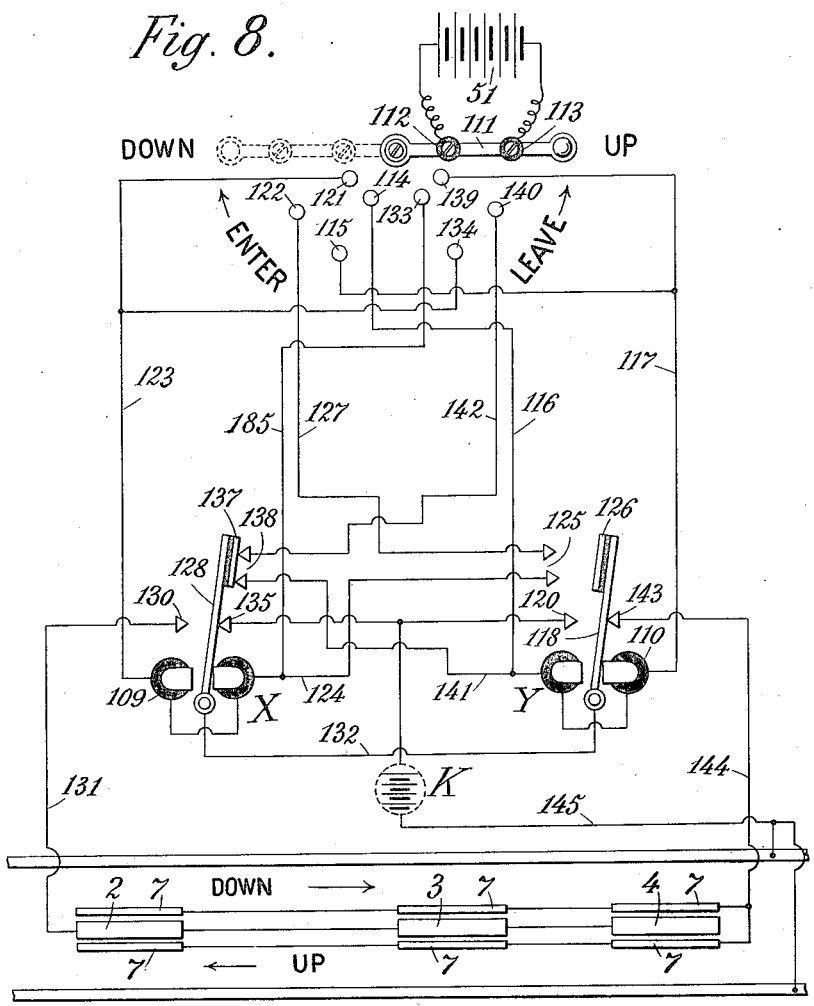
Figs. 8 and 22 represent apparatus at one end of a section of track, wherein track contacts are affected by means of polarized relays whose armatures are electrically interlocked.

In Fig. 8 are shown two polarized relays or similar switching instruments X and Y which have coils 109 and 110 and are controlled by the movement of the switch handle 111 on which are placed suitable insulated contacts 112 and 113 one of which is connected with one pole and the other with the other pole of the generator 51. The switch handle 111 is adapted to take up one of the two positions shown in full and in dotted lines in the figure. To make the road for the down journey it is moved into the position shown in the dotted lines, whereby the top contacts 2, 3, and 4, are connected with the rails and the side contacts 7, 7 are disconnected from the rails. When the switch handle is moved into the position shown in full lines in the right hand portion of the figure, the road for the up journey is made by the connexion of the contacts 7, 7 with the rails and the disconnexion of the contacts 2, 3, and 4 from the rails.

A train running on the down journey enters this end of the section controlled by the switch handle 111 (Fig. 8). The normal position of the switch handle 111 will be as shown in full lines, that is, when the up road is made as hereinafter described, and the train will be able to run on the up journey, that is to say, it will be able to leave the section. To enable the train to run on the down journey, the switch handle 111 must be moved into the position shown in dotted lines when the following operations will be performed. When contacts 112 and 113 interact with the contacts 114 and 115 respectively, current will flow from the generator 51 by wire 116 to the coils 110 of the polarized switching instrument Y, thence by wire 117 back to the generator. The armature 118 under the influence of the coils 110 will be moved to contact with contact 120 and to bridge the contacts 125 by the insulated contact plate 126.

When the contacts 112 and 113 interact with contacts 121 and 122 respectively, current will flow from the generator 51 by wire 123, coils 109, wire 124, contacts 125, wire 127, and back to the generator 51. The armature 128 under the influence of the coils 109 will now be moved to contact with contact 130. It will be seen that this circuit will not be completed unless the contacts 125 are bridged by the insulated plate 126.

The connexion between the top contacts 2, 3, and 4 and the rails is thus made by wire 131, contact 130, armature 128, wire 132, armature 118, contact 120, and wire 145, and the road for the down journey is made. Thus a train with its reversing switch 41 and commutator switch 100 set for the down journey on interacting with contacts 2, 3, and 4 will obtain clearance. When the switch handle 111 is moved into its final position shown in dotted lines, the current from the generator 51 is cut off and the down road is left made as herein described.

To make the road for the up journey the switch handle 111 is moved back into the position shown in full lines and the following operations will be performed. When contacts 112 and 113 make contact with contacts 133 and 134 respectively, current flows from the generator 51 through wire 185, coils 109, wire 123, and back to the generator 51. The direction of the current through the coils 109 of the polarized switching instrument at X is thus reversed and the armature 128 is thus moved over to make contact with contact 135 and to bridge the contacts 138 by its insulated plate 137, The top contacts 2, 3, and 4 are thus disconnected from the rails at contact 130 and when the switch handle 111 is moved over so that its contacts 112 and 113 contact with contacts 130 and 140 respectively, current flows from the generator 51 through wire 117, coils 110, wire 141, contacts 138, wire 142, and back to the generator 51. It will thus been seen that this circuit is not completed unless the contacts 138 are bridged by the insulated plate 137. The direction of the current through the coils 110 of the polarized switching instrument Y is thus reversed and its armature 118 is moved over to make contact with contact 143. The connexion between the side contacts 7, 7 and the rails is now made by wire 144, contact 143, armature 118, wire 132, armature 128, contact 135, and wire 145, and the up road is made. Thus a train with its reversing switch 41 and commutator switch 100 set for the up road will obtain clearance on interacting with the side contacts 7, 7. The switch handle 111 is finally moved into the position shown in full lines in the drawing, the current from the generator 51 is cut off, and the up road is left made. It will be seen that the armatures 128 and 118 are electrically interlocked, by which I mean that neither armature can be set to make the road for the up or down journey unless the other armature is set accordingly. Moreover should one of these armatures for any reason change its position after the road has been made for the down or up journey as herein described, none of the top contacts 2, 3, 4, and side contacts 7, 7 would be connected with the rails, and consequently neither the up nor the down road would be made.

Figure 9:
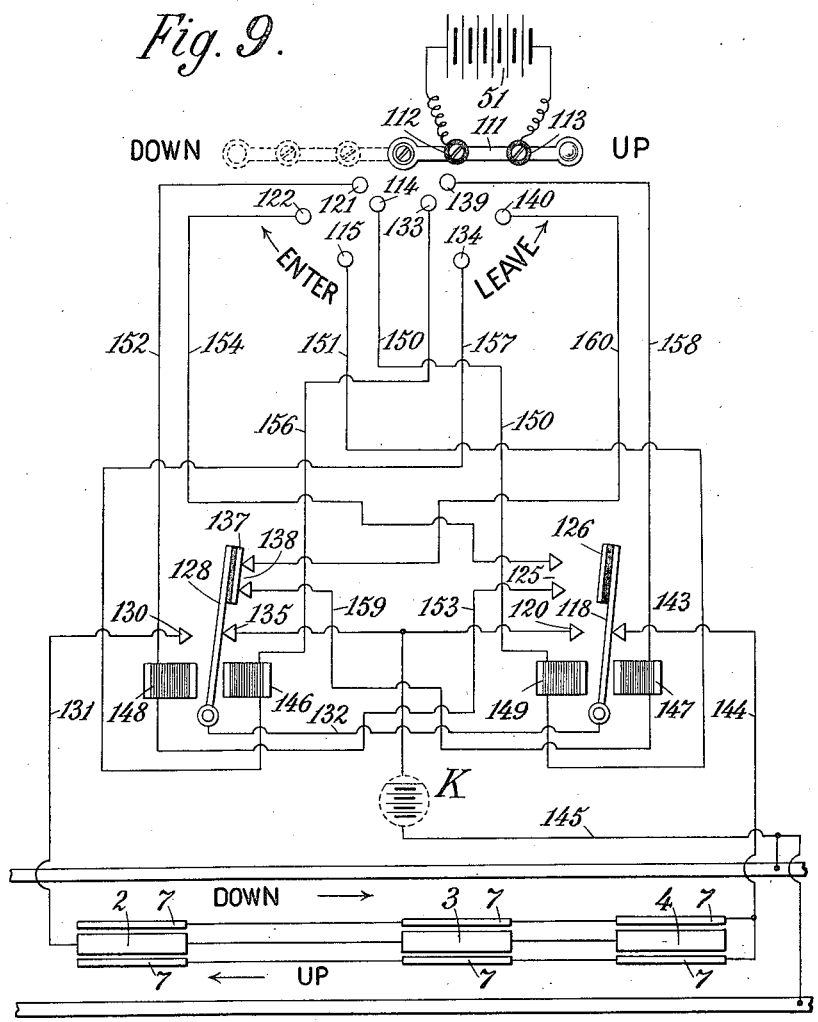
Figs. 9 and 23 are similar to Figs. 8 and 22 respectively, and show the use of non-polarized relays instead of polarized relays.

Fig. 9 shows how the same results may be obtained with the electrical interlocking of the armature 128 and 118 when what may be termed non-polarized switching instruments are used. In the example shown in this figure the armatures 128 and 118 are moved either to the right or to the left by the influence of the coils 146 and 147 or 148 and 149 respectively. The switching handle 111 as before is adapted to take up one of the two positions shown in full lines and in dotted lines in the figure. The position shown in full lines is the one occupied by the switching handle when the road is made for the up journey, that is when a train is leaving the section at the end shown in the figure, and the position shown in dotted lines is the one occupied by the switching handle when the road is made for the down journey, that is, when the train is entering the section at the end shown in the figure. To make the road for the down journey, the switch handle 111 is moved into the position shown in dotted lines, the following operations being performed. When contacts 112 and 113 make contact with contacts 114 and 115 respectively, current flows from the generator 51 through the wire 150, coils 149, and wire 151 back to the generator 51. The armature 118 is thus moved so that it contacts with contact 120 and its insulated contact plate 126 bridges contacts 125. The side contacts 7, 7 are thus disconnected from the rails at contact 143. When contacts 112 and 113 contact with contacts 121 and 122 respectively, current flows from the generator 51 through wire 152, coil 148, wire 153, contacts 125, wire 154, and back to the generator 51. The armature 128 is thus moved to contact with contact 130. It will be seen that this circuit is not completed unless contacts 125 are bridged by the insulated plate 126. The top contacts 2, 3, and 4 are thus connected with the rail by wire 131, contact 130, armature 128, wire 132, armature 118, contact 120 and wire 145, and the road for the down journey is thus made. The switch handle 111 is finally moved into the position shown in dotted lines when the current from the generator 51 is cut off and the road left made for the down journey.

To make the road for the up journey the switch handle 111 is moved into the position shown in full lines, the following operations being performed. When its contacts 112 and 113 contact with contacts 133 and 134 respectively current flows from the generator 51 through the wire 156, coils 146, wire 157, and back to the generator 51. Armature 128 is then attracted to contact with contact 135 and its insulated plate 137 bridges contacts 138. The top contacts 2, 3, and 4, are thus disconnected from the rails at contact 130. When the contacts 112 and 113 make contact with contacts 139 and 140 respectively current flows from the generator 51 through wire 158, coils 147, wire 159, contacts 138, wire 160, and back to the generator. It will be seen that this circuit is not completed unless contacts 138 are bridged by the insulated contact plate 137. The side contacts 7, 7 are thus connected with the rails by wire 144, contact 143, armature 118, wire 132, armature 128, contact 135, and wire 145. The road is thus made for the up journey, and a train with its reversing switch 41 and commutator switch 100 set for the up journey will obtain clearance. The switch handle 111 is finally moved into the position shown in full lines in the figure, the current from the generator 51 is cut off, and the road is left made for the up journey.

From the difference in height between signal and stop track contacts as shown in Figs. 10 and 11 it can be seen that stop contacts will effect a greater displacement of the shoe 1 than signal contacts.

When a track generator is used and no generator 40 is on the locomotive, the occurrence of a short-circuit may result in the failure of the coils 38 and 39 of the door magnets to be energized, and the locomotive on interacting with signal and stop contacts would thus be warned and stopped in the manner described. Should insufficient current or no current pass through the coils 38 and 39 of a locomotive when it interacts with the signal and stop contacts the same operations would be effected. It is intended that the line-clear intimation should not be given on the train unless a current whose strength is sufficient to restrain the warning or stopping operation, is obtained when a train interacts with a track contact. When the generator 40 is placed on the locomotive and no track generators are used, the occurrence of a short-circuit on the locomotive might result in the passage of a restraining current of sufficient strength through the coils 38 and 39, and the locomotive would be able to run over signal or stop contacts regardless of whether the down road or up road or neither had been made.

A method of preventing this is illustrated by Fig. 12. An electromagnet H is placed on the locomotive and resistances R are placed in the connexions of all top contacts and side contacts with the rails. For the sake of simplicity only a top contact such as 2 is shown connected as in Figs. 1 and 2 with the contact 43 thence by armature 44, wire 45, resistance R, with the rails, the contact 46 being connected with the side contacts 7, 7 (not shown). The connexion of either top contacts 2, 3, and 4, or side contacts 7, 7 with the rails may be accomplished in any of the methods herein described. The reversing switch 41, the commutator switch 100, and the bell or buzzer 181 are also, for the sake of simplicity, not shown.

Under normal conditions when a locomotive interacts with a top contact such as 2, which has been connected with the rails by a wire 42, contact 43, armature 44, wire 45, and resistance R, current of a predetermined value dependent on the value of the resistance R will flow from the additional generator 164, through the magnet H, to the frame and rails, thence through resistance R, wire 45, armature 44, contact 43, wire 42, contact 2, to the shoe 1, and back to the generator 164. The armature 165 will thus be moved against the pull of the spring 166 and gravity and make contact with the arm 167 thereby completing the circuit of the generator 40 and the coils 38 and 39 of the door magnets by wire 168, contacts 169 and 170, wire 171, arm 167, armature 165, wire 172, and coils 38 and 39. Clearance will thus be obtained when the train interacts with contact 2 and similarly with contacts 3, 4, and 7, 7 when these contacts have been connected to the rails. In Fig. 12 an additional generator 164 is shown but if desired it may be omitted and only one generator 40 used in the known manner.

It will be seen that the predetermined value of the current through H is dependent on the value of the resistance R in the rail circuit, and should a short-circuit occur on the locomotive or should the contact 2 short-circuit with the rails a circuit in which there is no resistance R would be completed from the generator 164 through the coils H. Consequently a current whose strength is greater than the normal would flow through the coils H, and the armature 165 would be attracted with sufficient force to lift or move the arm 167 against the action of the spring 173 and gravity and break the circuit of the generator 40 and the coils 38 and 39 at contacts 169 and 170. Consequently the locomotive would be warned when it interacts with a signal contact, and be both warned and stopped when it interacts with a stop contact. Should a current of value below that of the normal current or no current at all pass through the coils H when the locomotive is interacting with a track contact, the locomotive would be warned on a signal contact and stopped on a stop contact. Thus a departure from the predetermined value of the current flowing through the coils H when the locomotive interacts with track contacts will result in the production of a warning or a stopping operation.

Fig. 13 illustrates a method whereby switch handles such as 111 as shown in Figs. 8 and 9 in two signal boxes controlling the ends A and B of a section are electrically locked. Their normal positions are shown in full lines. When the switch handles are in these positions a train may pass out of the section at either end A or B. The signalman at A, desiring to allow a train running in the down direction to enter the section at his end must move his switch handle 111 into the position shown in dotted lines, and to enable him to do this, the signalman at B must press his switch C and so complete the circuit of the generator 188 through the coil 175 which attracts the plunger 177 against the action of the spring 178. The signalman at A is thus enabled to move his switch handle 111 into the position shown in dotted lines. After the train has entered the section the signalman at A must move his switch handle 111 back again to the position shown in full lines. He is able to do this without permission from the signalman at B, since the face 189 of the plunger 177 is for this purpose inclined at an angle. Moreover should the signalman at A desire to prevent the train from passing out of the section at his end he may move his switch handle 111 so that its contacts 112 and 113 contact with contacts 114 and 115 respectively, when the circuit for the up road would be broken as herein described. In this way, the signalman at A can always let a train out of the section at his end or if necessary prevent it from leaving the section, but to allow a train to enter the section he must obtain permission from the signalman at B.

Fig. 13 is drawn with special reference to the locking of a switch handle such as 111 as used in apparatus according to Figs. 8 or 9, but it is intended that switches such as 52 (Figs. 1 and 2) switch handles 68 and 69 (Fig. 3) levers 76 and 77 (Fig. 4) should be locked in a similar way. Any levers used for making or controlling a road for a train may where suitable be interlocked in the known way.

Fig. 14 shows the sectors 11 and 12 and the restoring levers 190, 191, and 192 contained in a suitable covering or box 195 which is securely locked, the key being in the possession of the guard or some other official.

The levers 190 and 191 protrude through the side of the said casing 195 in such a way that they can be operated at any time and thus the sounding of the danger whistle may always be stopped at will. The lever 192, however, which restores the sector 12 does not protrude without the box 195 and before it can be operated to restore the sector 12, the box 195 must be unlocked by the official having the key.

The description of the apparatus constructed according to Figs. 15 to 28 inclusive, and of its operation is as follows:—

Two insulated shoes 1 and 200 (Figs. 21 and 21^A) attached to and insulated from any desirable part of the locomotive or brake-van or other like vehicle are adapted to be moved or displaced to varying extents when interacting with track contacts arranged in pairs such as 2, 202, and 3, 203, and 4, 204 (Fig. 15, etc.), placed on or about or above the railway track, and when not in interaction with these track contacts are returned to their lowest or normal position by springs 5, and 201, acting on them in addition to gravity though they may be held in their normal positions by spring force alone or by gravity alone. The pairs of track contacts 2, 202, etc., are insulated from each other and mounted on some suitable non-conducting material as wood and may be composed of any suitable conducting material. All the track contacts are ramped as shown in the side elevations in Figs. 21^A, 24, and 25. The shoes 1 and 200 are displaced to the maximum extent when they interact with track contacts, such as 4, 204 which are known as stop contacts, signal contacts such as 2, 202, and 3, 203, being adapted to displace them to a smaller extent. The top parts 10 and 205 of the contacting devices 1 and 200 respectively are of the shapes shown in Fig. 21 and their normal positions are those shown in dotted lines, and are such that they mechanically restrain or hold in their normal positions sector-shaped pieces 11, 12 and 206, pivoted about 13, 14 and 207 respectively. To these sectors 11, 12, and 206 are attached doors or the like 15, 16, and 208 respectively, and armatures 17, 18, and 209 respectively. Against these doors 15, 16, and 208, press piston rods 19, 20, and 211, behind the pistons 21, 22, and 210 of which is fluid pressure (such as that of steam, air, or gas) which tends to move or push them out, and in addition there are springs 23, 24, and 212 also tending to push them out and thus open the doors 15, 16, and 208. In addition to these forces acting on the doors and tending to open them there is also the weight of the sectors which would alone be sufficient to cause them to fall or to be moved unless restrained by some part such as 10 and 205. The springs 23, 24, and 212 might in some cases be omitted. The shoe 1 is so arranged that if it becomes displaced from its normal position, either the sector 11 will move and cause a warning operation to be produced or if displaced to a sufficiently great extent the sectors 11 and 12 will move and a warning and stopping operation will be produced. The shoe 200 is so arranged that if it becomes sufficiently displaced from its normal position the sector 206 will move and a line-clear intimation will be given.

The cylinders 25 and 29 and the apparatus relating thereto for the production of a warning operation and a stopping operation respectively are constructed as hereinbefore described with reference to Fig. 7.

The cylinder 213 is similar to the cylinder 25 but when the door 208 falls or is moved and piston 210 forced out by the fluid pressure behind it, communication is made between the pipe 214 and the whistle 215 which is blown to give a line-clear signal.

Instead of using a whistle such as 215 to give the line-clear intimation a bell or buzzer 226 with its own battery 227 may be used as shown in Fig. 21^B. When the sector 206 falls or moves it completes the circuit of the battery 227 at contacts 228 and 229 and the bell or buzzer 226 is sounded.

Then a locomotive interacts with a pair of signal contacts such as 2, 202, or 3, 203, the shoes 200 and 1 are lifted to such an extent that the points 216 and 36 are raised or moved clear of the points 217 and 37 of the sectors 206 and 11 respectively. These sectors having no support will at once fall carrying with them the doors 208 and 15, unless they are otherwise restrained. The line-clear whistle 215 and the danger whistle 26 will both be blown until the doors 208 and 15 are replaced in the position shown in the figure. It will be seen that whilst interacting with track contacts such as 2, 202, or 3, 203, the sector 12 will not fall or be moved since the contacting face of the part 10 which engages with the sector 12 is longer than the contacting face which engages with the sector 11.

When the locomotive interacts with stop contacts such as 4, 204, the shoes 200 and 1 are moved or displaced as shown in Fig. 21 to a greater extent than when the locomotive interacts with signal contacts. The parts 205 and 10 are now lifted or moved clear of the sectors 206, 11 and 12 which will at once move or fall carrying with them the doors 208, 15 and 16 unless they are otherwise restrained. Both whistles 215 and 26 will be blown, brakes will be applied, and the motive power of the train will be cut off.

These operations will be performed when the locomotive interacts with contacts 2, 202, 3, 203, and 4, 204, etc., which are not connected with the rails, or when the current passing through the coils 218, 38 and 39 is insufficient to hold the armatures 209, 17 and 18 respectively. The sectors 206, 11 and 12 may be returned to their normal positions by suitable levers (Fig. 28).

When the shoe 200 interacts with track contacts which have been connected with the rails as hereinafter described with reference to Figs. 15, 16, etc., current will flow from the generator 40 (Fig. 21) carried on the locomotive or train, through wire 219, coils 218, wire 220, arm 221, and contact 222 of the commutator switch 100, wire 223, the shoe 200, contacts 2, 3, or 4 (Figs. 15 and 16) wire 42, contact 43, and armature 44 (when the armature 44 is in the position shown in the drawings) wire 45, the rails, and back to the generator 40 by the wheels and frame of the locomotive and wire 69. The armature 209 is thus attracted, the sector 208 is restrained from falling and the line-clear whistle 215 is not blown.

When the shoe 1 interacts with track contacts which have been connected to the rails, current will pass from the generator 40 through wire 224, contacts 230 and contacts 231 bridged by insulated contact plates 232 and 233 on extensions of the sectors 11 and 12 respectively, coils 38 and 39 which may be arranged either in series or parallel, wire 234, arm 47 and contact 49 of the commutator switch 100, wire 235, the shoe 1, contact 202, 203, or 204, wire 47 (Figs. 15 and 16), contact 46, armature 44 (when the armature 44 contacts with contact 46), wire 45, the rails and back to the generator 40 by the wheels and frame of the locomotive, and wire 69. The armatures 17 and 18 are thus attracted and the sectors 11 and 12 restrained from falling. Thus the danger whistle 26 is not blown, the steam is not shut off, and the brakes are not applied. Coils 218, 38 and 39 belong to electromagnets attached to the cylinders 213, 25 and 29 the armatures of which 209, 17 and 18 respectively are firmly attached to sectors 206, 11 and 12.

These coils when energized hold the sectors 206, 11 and 12 in the positions shown in the figure even after the parts 205 and 10 of the shoes 200 and 1 have been moved quite clear enough to fail to support them. The reversal of the position of the commutator switch 100 so changes the connexions of the coil 218 and the coils 38 and 39 with the shoes 200 and 1 that instead of the coils 218 being connected with the shoe 200, and the coils 38 and 39 with the shoe 1, the coils 218 becomes connected with the shoe 1 and the coils 38 and 39 with the shoe 200. This commutator switch must be operated when the locomotive is turned on a turntable, triangle, or the like a signal or stop contact or both contacts being used on or about the tracks adjacent to the turntable and so connected that unless the driver duly operates this commutator switch so as to complete the required circuits for the next journey of the train, the train would be warned or stopped or both as herein indicated. It will be seen that when a locomotive has been turned on a turntable and the commutator switch has been moved to change the connexions as above described, the current for restraining line-clear operations will pass through the warning and stopping contacting shoe 1 and the current for restraining warning and stopping operations will pass through line-clear contacting shoe 200.

The position of the armature 44 (Figs. 15 and 16, etc.) determines whether the road is clear or not clear. This armature is made to contact with contact 46 when the road is clear and with contact 43 when the road is to be blocked.

When the road is clear and the shoes 200 and 1 of a locomotive interact with track contacts 2, 202 and 3, 203 and 4, 204, the connexion of contacts 202, 203, and 204, with the rails will be made at contact 46 and that of the contacts 2, 3, and 4 with the rails broken at contact 43. Current will pass through the coils 38 and 39 restraining the danger whistle from blowing, brakes from being applied, and steam from being shut off, and also the sector 206 will fall on each occasion the whistle 215 being blown and giving a line-clear intimation.

When the road is blocked the connexion between the contacts 2, 3, and 4 and the rails is made at contact 43 and that between contacts 202, 203 and 204 and the rails broken at contact 46, and the locomotive interacting with contacts 2, 202 and 3, 203, will have its line-clear whistle 215 restrained from blowing, and its danger whistle will be blown, the coil 218 being energized and restraining the sector 206 from falling. The coil 38 not being energized since its circuit is broken at contact 46, will not restrain the sector 11 from falling.

Thus a danger signal given on 2, 202, is repeated on 3, 203, and when the train interacts with contacts 4, 204, the line-clear whistle is again restrained, but the part 10 is now lifted clear of the sector 12 which being now unrestrained by the coil 39 falls, and brakes are applied and steam shut off.

From the foregoing description it is evident that a locomotive attempting to run on the blocked line is thus warned and stopped, the warning indication if desired being repeated as here described, or, if desired, only one warning may be given.

In the case also of apparatus constructed and arranged according to Figs. 15 to 28 inclusive track batteries or generators marked K may be used, where required, instead of generator 40 on the locomotives.

The road is cleared or blocked according to whether the contacts 202, 203, and 204 or 2, 3, and 4 are connected with the rails. Various means for affecting the track contacts are shown in Figs. 15, 16, 17, 18, 19, 20, 22, and 23.

Figure 15:
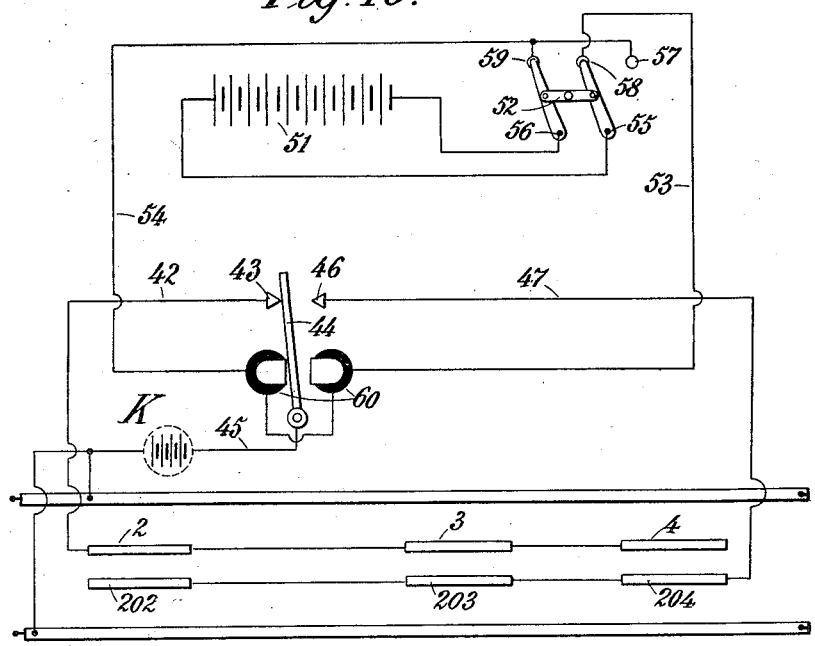

In Fig. 15 a polarized relay or similar switching apparatus is shown which is preferably placed adjacent to the track contacts at one end of a section and adapted either to connect or disconnect those track contacts to or from the rails as herein described, thus either making a road or blocking it, and which is operated by current from a generator 51 in a distant signal box. The reversing switch 52 operated by the signalman in the box enables him to operate the armature 44 of the switching instrument 60 through line wires 53 and 54 or if desired instead of through a complete metallic circuit through one wire and an earth return. The reversing switch 52 being in the position shown in Fig. 15, current passes from the generator 51 through contacts 55 and 58, wire 53, the coils 60, wire 54, contacts 59 and 56, and back to the generator. The armature 44 under the influence of the coils 60 will contact with contact 43 thus blocking the road. When the reversing switch 52 is moved over to make contact with contacts 57 and 58 the current through the coils 60 will be reversed and the armature 44 will contact with contact 46 instead of 43, a clear road thus being made.

Figure 16:
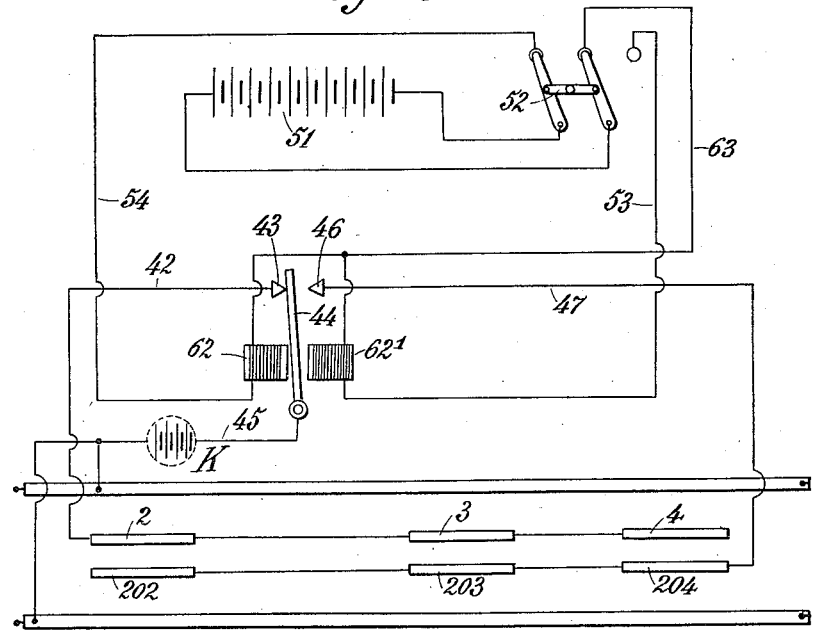

In Fig. 16 a non-polarized relay or like switching instrument comprising coils 62 and 62' which attract the common armature 44 in opposite directions is shown placed adjacent to the track contacts 2, 202, etc., and operated by current from the generator 51 in a distant signal box. By means of a suitable switch 52 the signalman energizes either coil 62 or 62' thus causing the armature 44 to make contact with either contact 43 which connects the contacts 2, 3, and 4 with the rails and thus blocks the road, or with contact 46 which connects contacts 202, 203, or 204 with the rails and makes a clear road. Line wires 53, 54, and 63 are used, but if desired two wires only and an earth return may be used instead.

Figure 17:
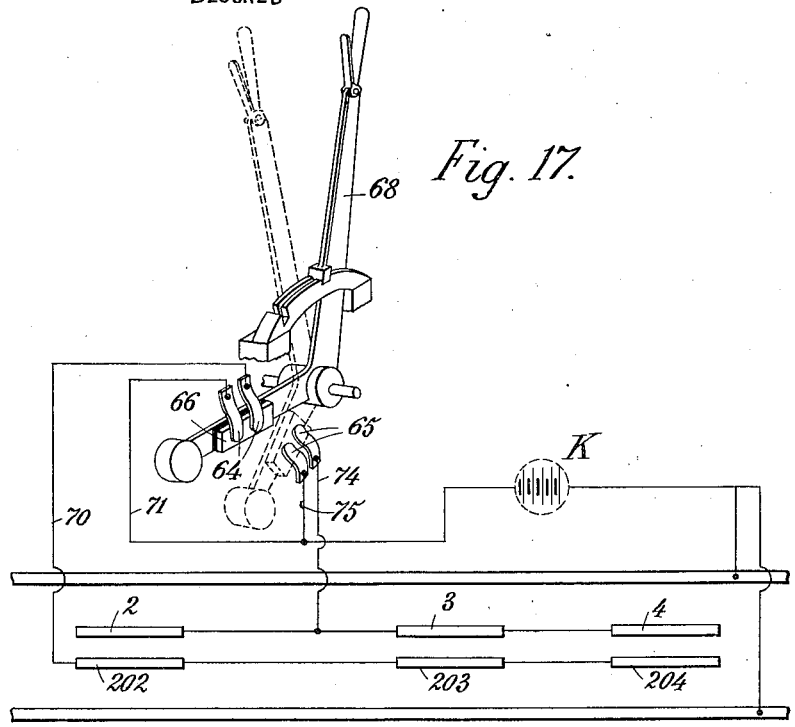

In Fig. 17 is shown a hand switch 68 which is adapted to take up one of two positions either to make or break the road for either direction of running. When in its normal position marked "blocked" (which it will always assume by virtue of its weighted end) its insulated contact plate 66 bridges contacts 65, the connexion between the contacts 2, 3, and 4 and the rails is made by wire 74, contacts 65, wire 75, and the line-clear intimations on a train are thus restrained. At the same time the contacts 64 are not bridged by the insulated contact plate 66, and the connexion between the contacts 202, 203, and 204 and the rails is broken. Thus when a train interacts with the contacts 202 and 203, the danger whistle 26 is blown and on interacting with contact 204 both warning and stopping operations are performed on the train. When the lever 68 is pulled over in the position shown, the contacts 202, 203, and 204 are connected with the rails by wire 70, contacts 64 and wire 71 and the warning and stopping operations are restrained, whilst the connexion of the contacts 2, 3, and 4 with the rails is broken at contacts 65 and the line-clear intimations on the train will be given when it interacts with contacts 2, 3, and 4.

In Fig. 18 is shown an ordinary weighted lever 76 which operates by the wire 78 the weighted switch 80 and which in its normal position connects the contacts 2, 3, and 4, with the rails by the contacting of the insulated plate 82, with the contact 85, thereby restraining the line-clear intimations on a train. At the same time the connexion between the contacts 202, 203, and 204 and the rails is broken at contact 83 and the warning and stopping operations on a train are therefore not restrained.

Thus on contacts 202 and 203 a warning will be given and on contact 204 both a warning and a stopping operation will be performed on a train.

When the lever 76 is pulled over as shown, the weighted switch 80 is moved so that its insulated contact plate 82 contacts with contact 83. The connexion of the contacts 202, 203 and 204 with the rails is thus made, and the warning and stopping operations on the train are restrained, and at the same time the connexion of the contacts 2, 3, and 4 with the rails is broken at contact 85, and a line-clear intimation is given on a train.

Figure 19:
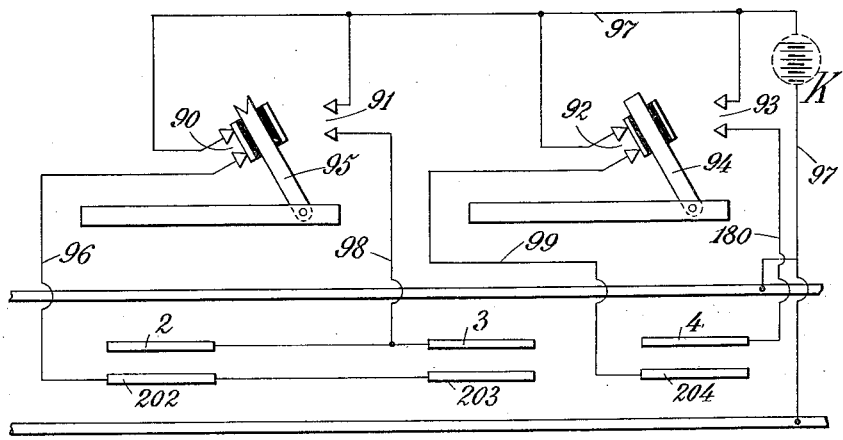

In the example shown in Fig. 19 ordinary track signals are used, on the arms of which are fixed contact plates adapted to bridge the contacts 90 and the contacts 92 and break the connexion between the contacts 91 and between the contacts 93, when the arms 95 and 94 are in the off position as shown in the figure. The distant arm 95 controls the contacts 2, 202, and 3, 203, and the home arm 94 the contacts 4, 204. When the arm 95 is off as shown, connexion is made between the contacts 202 and 203 and the rails by wire 96, contacts 90, and wire 97, and a warning operation on a train is restrained. On the other hand the connexion of the contacts 2 and 3 with the rails through wire 98, contacts 91, and wire 97 is broken at contacts 91, and a line-clear intimation is given on a train. When the signal arm 94 is in the off position as shown, connexion is made between the contact 204 and the rails by wire 99, contacts 92, and wire 97, the warning and stopping operations on a train are restrained and at the same time the connexion of contact 4 with the rails through wire 180, contacts 93, and wire 97, is broken at contacts 93, and line-clear intimations are given. When the arms 95 and 94 are in the on position the line-clear intimation on a train will be restrained owing to the fact that the contacts 2, 3, and 4, are connected with the rails a warning and a repeated warning are given on contacts 202, 203 and the train stopped by contact 204. The signal arms 94 and 95 may be operated in any known manner. The signals at the other end of the section are also adapted to operate in the manner herein described.

Fig. 20 shows a method of point detection. To avoid a multiplicity of line-clear intimations and as it is only necessary to warn and stop a train when the points are not set correctly, the contacts 2 and 4 relating to the line-clear intimations are omitted and only contacts 202 and 204 relating to the warning and stopping operations on a train respectively are shown. A train running towards the facing points will on contact 202 have warning operations restrained and on contact 204 stopping operations restrained if these contacts are duly connected with the rails by wire 103 and either contacts 107 and 108 or contacts 104 and 105—that is to say, if the points are correctly made for the main line or for the branch line. Should the blades 101 and 102 not be correctly set for either road the circuit will not be completed and a train will be warned on contact 202 and stopped on contact 204.

Figure 22:
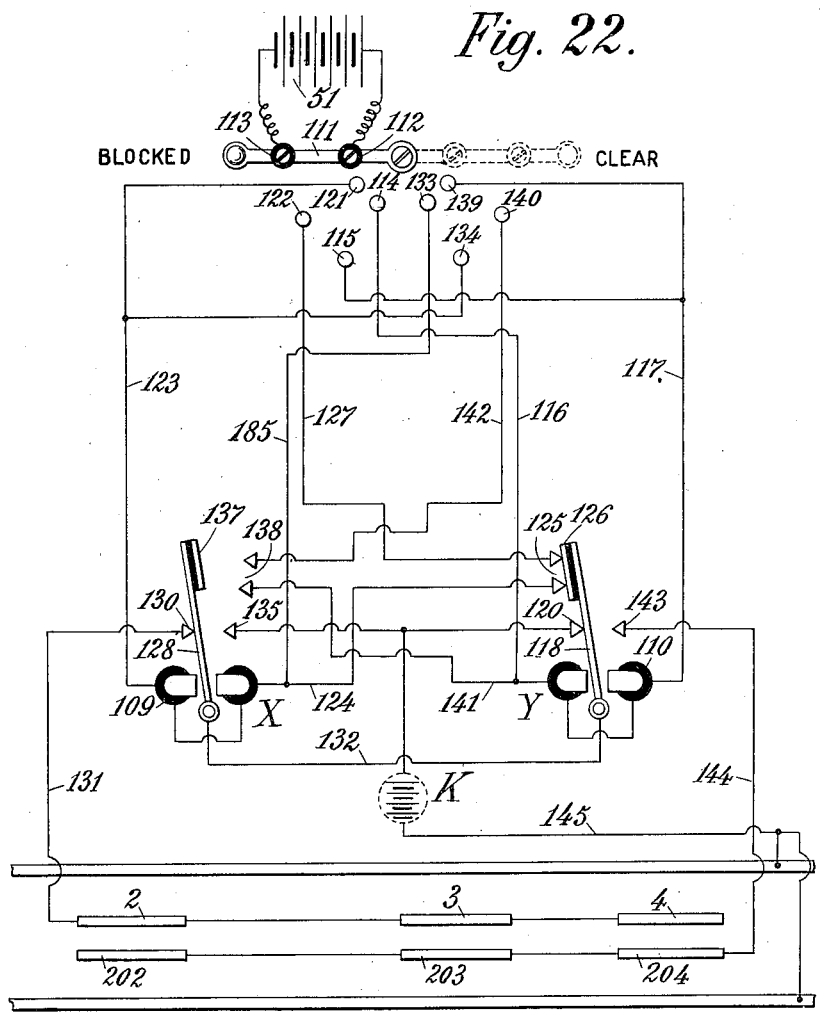

In Fig. 22 are shown two polarized relays or similar switching instruments X and Y which have coils 109 and 110 and are controlled by the movements of the switching handle 111 on which are placed suitable insulated contacts 112 and 113 one of which is connected with one pole and the other with the other pole of the generator 51. The switch handle 111 is adapted to take up one of the two positions shown in full and in dotted lines in the figure, thus either blocking a road or clearing it. When the switching handle is moved into the "blocked" position, contacts 2, 3, and 4 are connected with the rails, the line-clear intimations are restrained and contacts 202, 203, and 204 are disconnected from the rails and warning and stopping operations are performed on a train passing over these contacts. On the other hand, when the switching handle is in the position marked "Clear" the contacts 202, 203, and 204 are connected with the rails and warning and stopping operations are restrained, and the contacts 2, 3, and 4 are disconnected from the rails and line-clear intimations are given on a train passing over these contacts.

The normal position of the switch handle 111 is the position marked "Blocked," and to enable a train to pass over the end of the section shown in the figure the switch handle must be moved over to the position marked "Clear" the following operations being performed. When the contacts 112 and 113 interact with contacts 133 and 134 respectively, current flows from the generator 51, through wire 185, coils 109 of the polarized switching instrument X, wire 123, and back to the generator 51. The armature 128 under the influence of the coils 109 will be moved to contact with contact 135 and to bridge the contacts 138 by the insulated contact plate 137.

When the contacts 112 and 113 interact with contacts 139 and 140 respectively, current flows from the generator 51 through wire 117, coils 110 of the polarized switching instrument Y, wire 141, contacts 138, wire 142, and back to the generator 51. The armature 118 under the influence of the coils 110 will move to contact with contact 143. It will be seen that this circuit is not completed unless the contacts 138 are bridged by the insulated plate 137. The contacts 202, 203, and 204 are thus connected with the rails by wire 144, contact 143, armature 118, wire 132, armature 128, contact 135, and wire 145, and a train interacting with contacts 202, 203, and 204 will have warning and stopping operations restrained, but line-clear intimations given thereon, since the connexion between the contacts 2, 3, and 4 and the rails is broken at contact 130. When the switch handle 111 is moved into its final position marked "Clear," the current from the generator 51 is cut off and the road is left clear as herein described.

After a train has passed over the clear road the switch handle 111 is returned to its normal position marked "Blocked," and in doing this the following operations are performed. When contacts 112 and 113 contact with contacts 114 and 115 respectively, current flows from the generator 51, through wire 116, the coils 110 of the polarized switching instrument Y, through wire 117, and back to the generator. The direction of the current through the coils 110 is thus reversed and the armature 118 is moved over to contact with contact 120, and to bridge the contacts 125 by its insulated plate 126. The contacts 202, 203, and 204 are thus disconnected from the rails at contact 143, and when the switch handle 111 is moved so that its contacts 112 and 113 contact with contacts 121 and 122 respectively current flows from the generator 51 through wire 123, the coils 109 of the polarized switching instrument X, through wire 124, contacts 125, wire 127, and back to the generator. It will be seen that this circuit is not completed unless the contacts 125 are bridged by the insulated contact plate 126. The direction of current through the coils 109 is thus reversed, and the armature 128 is moved over to contact with contact 130. The contacts 2, 3, and 4 are now connected with the rails through wire 131, contact 130, armature 128, wire 132, armature 118, contact 120, and wire 145. Thus line-clear intimations on a train will be restrained but warning and stopping operations will be performed thereon since the connection between the contacts 202, 203, and 204 and the rails is broken at contact 143. When the switch handle 111 is moved into its final position marked "Blocked" the current from the generator 51 is cut off and the road is left blocked. It will thus be seen that the armatures 128 and 118 are electrically interlocked, by which I mean that neither armature can be moved to make up a certain definite position unless the other armature has also taken up a certain definite position. Moreover, should either of these armatures for any reason change its position after having been moved as herein described, none of the contacts 2, 3, 4, nor 202, 203, 204 would be connected with the rails and consequently the warning and stopping operations (and also line-clear intimations) on the train would not be restrained and the train would be warned and stopped accordingly.

Figure 23:
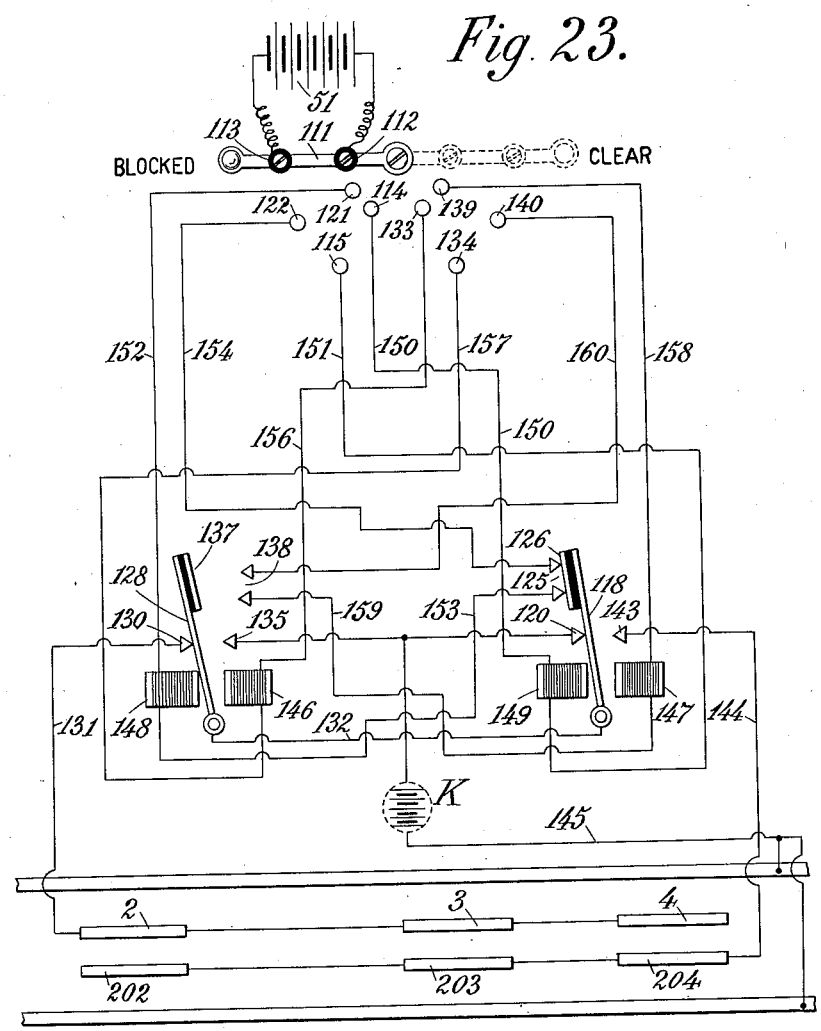

Fig. 23 shows how the same results may be obtained with the electrical interlocking of the armatures 128 and 118 when what may be termed non-polarized switching instruments are used. In the example shown in this figure the armatures 128 and 118 are moved either to the right or to the left by the influence of the coils 146 and 147 or 148 and 149 respectively. The switching handle 111, as before, is adapted to take up one of the two positions shown in full lines and in dotted lines in the figure. When the switching handle is in the position marked "Clear" the contacts 202, 203, and 204, will be connected with the rails, thereby causing the warning and stopping operations on a train to be restrained but the contacts 2, 3 and 4 will not be connected with the rails and the line-clear intimations will be given. On the other hand, when the switch handle 111 is in the position marked "Blocked" the contacts 2, 3, and 4 will be connected with the rails and line-clear intimations on a train restrained but the contacts 202, 203, and 204 are not connected with the rails, so that warning and stopping operations are performed on a train. The switch handle 111 is normally in the position marked "Blocked" and to clear the road, must be moved into the position marked "Clear," the following operations being performed. When contacts 112 and 113 contact with contacts 133 and 134 respectively, current flows from the generator 51 through wire 156, coil 146, wire 157, and back to the generator 51. The armature 128 is thus moved so that it contacts with contact 135 and its insulated plate 137 bridges the contact 138. When the contacts 112 and 113 are made to contact with contacts 139 and 140 respectively, current flows from the generator 51 through wire 158, the coils 147, wire 159, contacts 138, wire 160, and back to the generator, and the armature 118 is moved to contact with contact 143. It will be seen that this circuit is not completed unless contacts 138 are bridged by the insulated plate 137. The contacts 202, 203, and 204 are thus connected with the rails by wire 144, contacts 143, armature 118, wire 132, armature 128, contact 135, and wire 145, and warning and stopping operations on a train are restrained. The contacts 2, 3, and 4, however, are disconnected from the rails at contact 130 and thus line-clear intimations are given on a train. When the switch handle 111 is moved into its final position marked "Clear," the current from the generator 51 is cut off and the road left clear. After the train has been allowed to pass over the clear road the switch handle 111 is returned to its normal position marked "Blocked" the following operations being performed. When contacts 112 and 113 interact with contacts 114 and 115 respectively current flows from the generator 51 through the wire 150, the coil 149, wire 151, and back to the generator 51. Armature 118 is thus moved over to contact with contact 120 and its insulated plate 126 bridges contacts 125. The contacts 202, 203, and 204 are thus disconnected from the rails at contacts 143. When the contacts 112 and 113 contact with contacts 121 and 122 respectively, current flows from the generator 51 through wire 152, coils 148, wire 153, contacts 125, wire 154, and back to the generator. It will be seen that this circuit is not completed unless contacts 125 are bridged by the insulated contact plate 126. The contacts 2, 3, and 4 are thus connected with the rails through wire 131, contact 130, armature 128, wire 132, armature 118, contact 120, and wire 145. Line-clear intimations on a train are thus restrained but not warning or stopping operations, since the connexion between the contacts 202, 203, and 204 and the rails has been broken at contact 143. When the switch handle 111 is moved into its final position marked "Blocked," the current from the generator 51 is cut off, and the road is left blocked.

From the difference in height between the signal and stop track contacts as shown in Figs. 24 and 25, it can be seen that the stop contacts will effect a greater displacement of the shoes than the signal contacts.

Fig. 26 has been drawn as simply as possible, the line-clear apparatus, commutator switch, etc., having been omitted, and only the contact 204 relating to the warning and stopping operations has been shown. The contacts 204 may be connected with the rails by any of the methods herein described, and is here shown for the sake of simplicity connected with contact 46 as in Figs. 15 and 16.

The purpose of the apparatus shown in this figure and its mode of operation are the same as described with reference to Fig. 12.

Fig. 27 illustrates a method whereby switch handles such as 111 shown in Figs. 22 and 23 in two signal boxes controlling the ends A and B of a section are electrically locked. Their normal positions are as shown in full lines. When the switch handles are in these positions, the road is blocked at each end of the section. The signalman at A, desiring to clear the road for a train at his end A of the section must move his switch handle 111 into the "clear" position, and to enable him to do this the signalman at B must press his switch C thereby completing the circuit of the generator 188 through the coil 175 which attracts the plunger 177 against the action of the spring 178. The signalman at A is thus enabled to move his switch handle 111 into the "clear" position and after the train has passed over the track contacts relating to his end A of the section, he must move it back again to the blocked position. He is able to do this without permission from the signalman at B as the face 189 of the plunger 177 is for this purpose inclined at an angle. Thus the signalman at A can always block his end of the section to trains running in either direction but must always obtain permission from the signalman at B to make a clear road. A similar method of operation applies to the signalman at B. Fig. 27 is drawn with special reference to the locking of a switch handle such as 111 as used in apparatus according to Fig. 22 or 23, but it is intended that switches such as 52 (Figs. 15 and 16) and 68 (Fig. 17) and lever 76 (Fig. 18) should be locked in a similar way. Any levers used for making or controlling the road for a train may where suitable be interlocked in the known way.

Fig. 28 shows the sectors 206, 11, and 12 and the restoring levers 197, 191, and 192 and also 198 and 190 contained in a suitable covering or box 195 which is securely locked, the key being in the possession of the guard or some other official.

All these levers except 192 protrude through the side of the said box 195 in such a way that they can be operated at any time and thus the sectors relating to the line-clear and danger whistles may always be restored at will. The lever 192 which restores the sector 12 does not protrude without the box 195 and before it can be operated to restore the sector 12 the box 195 must be unlocked by the official having the key.

Thus in the case also of apparatus constructed according to Figs. 15 to 28 inclusive a train which has been stopped as herein indicated is thus unable to continue its journey without the full cognizance of the guard or other official in possession of the key.

The apparatus shown in Fig. 29 is a modified form of the apparatus shown in Fig. 7 and of the track apparatus for use therewith when trains are only required to run in one direction along a track. It will be seen that the reversing gear switch and the commutator switch are omitted from the train apparatus and that only a single contact device is used on the train for causing warning and stopping operations to be restrained by the substitutional restraining means on contact being effected with a track contact. The track apparatus is also simplified by the omission of the side contact plates on the track contacts and the circuits connected thereto.

Each train should be equipped with some suitable automatic brake.

By the term "train" used in connexion with these improvements, I mean a locomotive or brakevan or other like vehicle, as the case may be, adapted as herein indicated.

The foregoing description indicates preferred arrangements of apparatus according to this invention, but it is evident that various modifications may be made without departing from the invention. Track contacts may be used on any part of the railway track for producing a warning or stopping operation on the train in the manner hereinbefore indicated. Where desired the track contacts may be suitably supported and affixed above the railway tracks and the contacting devices on the train may be correspondingly supported above the train and adapted to interact with these track contacts.

Where it is desired to protect trains only against following trains the apparatus may be suitably modified and any parts not required may be omitted.

What I claim is:—

1. Train protecting apparatus comprising danger-indicating apparatus and train-stopping apparatus located on a train, non-electrical means adapted to restrain the operation of each of said apparatus, track contacts of two different natures located along a track, a single contacting device on said train adapted to come into contact with said track contacts and thereby to cause said non-electrical means to lose its restraint on said danger-indicating apparatus on contact with a track contact of one nature and to lose its restrain on said train-stopping apparatus on contact with a track contact of the other nature, and substitutional restraining means adapted to restrain the operation of said danger indicating apparatus and of said train-stopping apparatus.

2. Train protecting apparatus comprising danger-indicating apparatus and train stopping apparatus located on a train, non-electrical means adapted to restrain the operation of each of said apparatus, track contacts of two different natures located along a track, a single contacting device on said train adapted to come into contact with said track contacts and thereby to cause said non-electrical means to lose its restraint on said danger-indicating apparatus on contact with a track contact of one nature and to lose its restraint on both of said apparatus on contact with a track contact of the other nature, and substitutional restraining means adapted to restrain the operation of said danger indicating apparatus and of said train-stopping apparatus.

3. Train protecting apparatus comprising danger indicating apparatus and train-stopping apparatus located on a train, non-electrical means adapted to restrain the operation of each of said apparatus, track contacts of two different natures located along a track, a single contacting device on said train adapted to come into contact with said track contacts and thereby to cause said non-electrical means to lose its restraint on said danger-indicating apparatus on contact with a track contact of one nature and to lose its restrain on said train-stopping apparatus on contact with a track contact of the other nature, two of said track contacts being arranged so that a contact for causing a warning operation to be effected on the train is followed by a contact for causing a stopping operation to be effected on the train, and substitutional restraining means adapted to restrain the operation of said danger-indicating apparatus and of said train-stopping apparatus.

4. Apparatus for the protection of trains comprising line-clear intimating apparatus located on a train a movable element constantly tending to move from its normal position and adapted when in said normal position to prevent the operation of said line-clear intimating apparatus, a movable contacting device on said train, a second element movable by said contacting device and adapted when in normal position to prevent movement of the first mentioned element from its normal position, track contacts arranged along a railway track and adapted to come into contact with and to displace said movable contacting device, and substitutional means adapted to maintain the first mentioned element in normal position when said second element is displaced from its normal position by contact of said contacting device with one of said track contacts.

5. Apparatus for the protection of trains comprising train-stopping apparatus and warning apparatus located on a train, two movable elements constantly tending to move from their normal positions and adapted when in said normal positions to prevent the operation of said train-stopping apparatus and of said warning apparatus respectively, a movable contacting device on said train, a third element movable by said contacting device and adapted when in normal position to prevent movement of the first mentioned elements from their normal positions, track contacts arranged along a railway track and adapted to come into contact with and to displace said movable contacting device, and substitutional means adapted to maintain the first mentioned elements in their normal positions when said third element is displaced from its normal position by contact of said contacting device with one of said track contacts.

6. Apparatus for the protection of trains comprising train-stopping apparatus and warning apparatus located on a train, two movable elements constantly tending to move from their normal positions and adapted when in said normal positions to prevent the operation of said train-stopping apparatus and of said warning apparatus respectively, a movable contacting device on said train, a third element movable by said contacting device into different positions and adapted when in normal position to prevent movement of both of the first mentioned elements from their normal positions, when in another position to allow movement of one of the first mentioned elements from its normal position, and when in a third position to allow movement of the other of the first mentioned elements from its normal position, track contacts arranged along a railway track and adapted to come into contact with said movable contacting device and thereby to give it different displacements, and substitutional means adapted to maintain the first mentioned elements in their normal positions when said third element is displaced from its normal position by contact of said contacting device with one of said track contacts.

7. Apparatus for the protection of trains comprising danger-indicating apparatus and line-clear intimating apparatus located on a train, a movable element constantly tending to move from its normal position and adapted when in said normal position to prevent the operation of said danger indicating apparatus, a movable contacting device on said train, a second element movable by said contacting device and adapted when in normal position to prevent movement of the first mentioned element from its normal position, track contacts arranged along a railway track and adapted to come into contact with and to displace said movable contacting device, means adapted to cause the operation of said line-clear intimating apparatus, and substitutional means adapted to maintain the first mentioned element in normal position when said second element is displaced from its normal position by contact of said contacting device with one of said track contacts.

8. Apparatus for the protection of trains comprising danger-indicating apparatus and line-clear intimating apparatus located on a train, a movable element constantly tending to move from its normal position and adapted when in said normal position to prevent the operation of said indicating apparatus, a movable contacting device on said train, a second element movable by said contacting device and adapted when in normal position to prevent movement of the first mentioned element from its normal position, a third movable element constantly tending to move from its normal position and adapted when in said normal position to prevent the operation of said line-clear intimating apparatus, a second movable contacting device on said train, a fourth element movable by said second contacting device and adapted when in normal position to prevent movement of the third element from its normal position, track contacts arranged along a railway track and adapted to come into contact with and to displace said movable contacting devices, substitutional means adapted to maintain the first mentioned element in normal position when said second element is displaced from its normal position by contact of the corresponding contacting device with one of said track contacts, and substitutional means adapted to maintain the third element in normal position when said fourth element is displaced from its normal position by contact of the corresponding contacting device with one of said track contacts.

9. Apparatus for the protection of trains comprising train-stopping apparatus, warning apparatus, and line-clear intimating apparatus located on a train, two movable elements constantly tending to move from their normal positions and adapted when in said normal positions to prevent the operation of said train-stopping apparatus and of said warning apparatus respectively, a movable contacting device on said train, a third element movable by said contacting device into different positions and adapted when in normal position to prevent movement of both of the first mentioned elements from their normal positions, when in another position to allow movement of one of the first mentioned elements from its normal position, and when in a third position to allow movement of the other of the first mentioned elements from its normal position, track contacts arranged along a railway track and adapted to come into contact with said movable contacting device and thereby to give it different displacements, a fourth movable element constantly tending to move from its normal position and adapted when in said normal position to prevent the operation of said line-clear intimating apparatus, a second movable contacting device on said train, a fifth element movable by said second contacting device and adapted when in normal position to prevent movement of said fourth element from its normal position, track contact arranged along a railway track and adapted to come into contact with and to displace said second movable contacting device, substitutional means adapted to maintain the first mentioned elements in their normal positions when said third element is displaced from its normal position by contact of the first mentioned contacting device with a track contact, and substitutional means adapted to maintain the fourth element in normal position when said fifth element is displaced from its normal position by contact of the corresponding contacting device with a track contact.

10. Apparatus for the protection of trains comprising train-stopping apparatus and warning apparatus located on a train, two movable elements constantly tending to move from their normal positions and adapted when in said normal positions to prevent the operation of said train-stopping apparatus and of said warning apparatus respectively, a movable contacting device on said train, a third element movable by said contacting device into different positions and adapted when in normal position to prevent movement of both of the first mentioned elements from their normal positions, when in another position to allow movement of one of the first mentioned elements from its normal position, and when in a third position to allow movement of the other of the first mentioned elements from its normal position, track contacts arranged along a railway track and adapted to come into contact with said movable contacting device and thereby to give it different displacements, electro-magnetic devices adapted when energized to maintain the first mentioned elements in their normal positions, an electric circuit including said electro-magnetic devices and a generator of electricity and arranged partly on the track and adapted to be completed on contact of said contacting device with one of said track contacts, and means adapted to break the track portion of said electric circuit.

11. Apparatus for the protection of trains comprising danger-indicating apparatus and line-clear intimating apparatus located on a train, a movable element constantly tending to move from its normal position and adapted when in said normal position to prevent the operation of said danger indicating apparatus, a movable contacting device on said train, a second element movable by said contacting device and adapted when in normal position to prevent movement of the first mentioned element from its normal position, a third movable element constantly tending to move from its normal position and adapted when in said normal position to prevent the operation of said line-clear intimating apparatus, a second movable contacting device on said train, a fourth element movable by said second contacting device and adapted when in normal position to prevent movement of the third element from its normal position, track contacts arranged along a railway track and adapted to come into contact with and to displace said movable contacting devices, an electromagnetic device adapted when energized to maintain the first mentioned element in normal position, an electric circuit including said electro-magnetic device a generator of electricity and arranged partly on the track and adapted to be completed by contact of one of said contacting devices, with one of said track contacts, a second electro-magnetic device adapted when energized to maintain said third element in normal position, an electric circuit including said second electro-magnetic device and a generator of electricity and arranged partly on the track and adapted to be completed by contact of the other of said contacting devices with one of said track contacts, and means adapted to break the track portion of either one of said electric circuits.

12. Apparatus for the protection of trains comprising indicating apparatus located on a train, a valve constantly tending to move into operative position and thereby to cause the operation of said indicating apparatus, a movable element adapted when in normal position to hold said valve in inoperative position, a movable contacting device located on said train and including a second element adapted when in normal position to prevent movement of the first mentioned element from its normal position, track contacts arranged along a railway track and adapted to come into contact with and to displace said movable contacting device and consequently said second element, and substitutional means adapted to maintain the first mentioned element in normal position when said second element is displaced from its normal position by contact of said contacting device with one of said track contacts.

13. Apparatus for the protection of trains comprising indicating apparatus located on a train, a movable element constantly tending to move from its normal position and adapted when in said normal position to prevent the operation of said indicating apparatus, a movable contacting device on said train, a second element movable by said contacting device and adapted when in normal position to prevent movement of the first mentioned element from its normal position, track contacts arranged along a railway track and adapted to come into contact with and to displace said movable contacting device, an electro-magnetic device adapted when energized to maintain the first mentioned element in normal position, two current paths located on the track and corresponding respectively to opposite directions of travel of said train, switching means located on the track and adapted to enable only one of said current paths to be completed at a time, and switching means located on said train and adapted to cause a circuit including said electromagnetic device to be completed by one or other of said paths on contact of said contacting device with one of said track contacts.

14. Apparatus for the protection of trains comprising danger-indicating apparatus and line-clear intimating apparatus located on a train, pairs of track contacts arranged along a railway track, the contacts of each pair corresponding respectively to opposite directions of travel of trains on the railway track, two movable contacting devices on said train adapted to come into contact with and to be displaced by said track contacts, two current paths on the track, switching means located on the track and adapted to enable only one of said paths to be completed at a time, two electro-magnetic devices adapted when energized to prevent the operation of said danger indicating and said line-clear intimating apparatus respectively and adapted on contact of said contacting devices with one of said pairs of track contacts to form circuits with said two current paths respectively.

15. Apparatus for the protection of trains comprising danger-indicating apparatus and line-clear intimating apparatus located on a train, pairs of track contacts arranged along a railway track, the contacts of each pair corresponding respectively to opposite directions of travel of trains on the railway track, two movable contacting devices on said train adapted to come into contact with and to be displaced by said track contacts, two current paths on the track, switching means located on the track and adapted to enable only one of said paths to be completed at a time, two electromagnetic devices adapted when energized to prevent the operation of said danger-indicating and said line-clear intimating apparatus respectively and adapted on contact of said contacting devices with one of said pairs of track contacts to form circuits with said two current paths respectively, and switching means located on said train and adapted to reverse the connexion between said electromagnetic devices and said current paths.

16. Apparatus for the protection of trains comprising indicating apparatus located on a train, a movable element constantly tending to move from its normal position and adapted when in said normal position to prevent the operation of said indicating apparatus, a movable contacting device on said train, a second element movable by said contacting device and adapted when in normal position to prevent movement of the first mentioned element from its normal position, track contacts arranged along the railway track and adapted to come into contact with and to displace said movable contacting device, an electro-magnetic device adapted when energized to maintain the first mentioned element in normal position, an electric circuit including a generator of electricity and said electro-magnetic device, an electro-magnetic circuit making and breaking device controlling said electric circuit and adapted when energized by current of one strength to make said electric circuit and when energized by a current of any other strength to break said electric circuit, a second electric circuit including said electro-magnetic circuit making and breaking device and a generator of electricity and arranged partly on the track and adapted to be completed on contact of said contacting device with one of said track contacts, and means adapted to break the track portion of the second electric circuit.

17. Apparatus for the protection of trains comprising train-stopping apparatus and warning apparatus located on a train, two movable elements constantly tending to move from their normal positions and adapted when in said normal positions to prevent the operation of said train stopping apparatus and of said warning apparatus respectively, a movable contacting device on said train, a third element movable by said contacting device into different positions and adapted when in normal position to prevent movement of both of the first mentioned elements from their normal positions, when in another position to allow movement of one of the first mentioned elements from its normal position, and when in a third position to allow movement of the other of the first mentioned elements from its normal position, track contacts arranged along a railway track and adapted to come into contact with said movable contacting device and thereby to give it different displacements, electro-magnetic means adapted when energized to maintain the first mentioned elements in their normal positions, an electric circuit including said electro-magnetic means and a generator of electricity, an electromagnetic circuit making and breaking device controlling said electric circuit and adapted when energized by current of one strength to make said electric circuit and when energized by a current of any other strength to break said electric circuit, a second electric circuit including said electromagnetic circuit making and breaking device and a generator of electricity and arranged partly on the track and adapted to be completed on contact of said contacting device with one of said track contacts, and means adapted to break the track portion of said second electric circuit.

18. Train protecting apparatus comprising indicating apparatus located on a train, a contacting device on a vehicle of said train, two series of track contacts arranged along a railway track and corresponding respectively to opposite directions of facing of said vehicle, said track contacts being adapted to come into contact with said contacting device, an electric circuit controlling the operation of said indicating apparatus and arranged partly on said train and partly on said track and adapted to be completed by contact of said contacting device with a track contact, two electro-magnetic switching devices whose armatures when each is in a particular position complete the track portion of the circuit of the track contacts of one of said series and when each is in another position complete the track portion of the circuit of the track contacts of the other of said series, electric circuits for operating each of said electro-magnetic switching devices, a generator of electricity, and switching means adapted to complete successively the said electric circuits through said generator, so as to cause the successive operation of said two electro-magnetic switching devices.

19. Train protecting apparatus comprising indicating apparatus located on a vehicle of a train, a contacting device on said train, two series of track contacts arranged along a railway track and corresponding respectively to opposite directions of facing of said vehicle, said track contacts being adapted to come into contact with said contacting device, an electric circuit controlling the operation of said indicating apparatus and arranged partly on said train and partly on said track and adapted to be completed by contact of said contacting device with a track contact, two electro-magnetic switching devices whose armatures when each is in a particular position complete the track portion of the circuit of the track contacts of one of said series and when each is in another position complete the track portion of the circuit of the track contacts of the other of said series, a generator of electricity, switching means, an electric circuit for operating one of said electro-magnetic devices and adapted to be completed through said generator by said switching means, and a second electric circuit for operating the other of said electro-magnetic devices and adapted to be completed through said generator by contact of the armature of the first mentioned electro-magnetic device with a contact and by said switching means, said switching means being adapted to complete successively the said electric circuits in the order named so as to cause the successive operation of the said two electro-magnetic devices in the corresponding order.

20. Train protecting apparatus comprising danger-indicating apparatus and line-clear indicating apparatus located on a train, two contacting devices on said train, two series of track contacts arranged along a railway track and adapted to produce the operation of said danger-indicating apparatus and of said line-clear indicating apparatus respectively, the track contacts of each series being adapted to come into contact with one of said contacting devices, electric circuits controlling the operation of said danger-indicating apparatus and of said line-clear indicating apparatus respectively and each arranged partly on the train and partly on the track and adapted to be completed by contact of a corresponding one of said contacting devices with a track contact, and means on said track adapted to break the track portion of the circuit of the track contacts of one of said series and to complete the track portion of the circuit of the track contacts of the other of said series.

21. Train protecting apparatus comprising danger-indicating apparatus and line-clear indicating apparatus located on a train, two contacting devices on said train, two series of track contacts arranged along a railway track and adapted to produce the operation of said danger-indicating apparatus and of said line-clear indicating apparatus respectively, the track contacts of each series being adapted to come into contact with one of said contacting devices, electric circuits controlling the operation of said danger-indicating apparatus and of said line-clear indicating apparatus respectively and each arranged partly on the train and partly on the track and adapted to be completed by contact of a corresponding one of said contacting devices with a track contact, two electro-magnetic switching devices whose armatures when each is in a particular position complete the track portion of the circuit of the track contacts of one of said series and when each is in another position complete the track portion of the circuit of the track contacts of the other of said series, electric circuits for operating each of said electro-magnetic switching devices, a generator of electricity, and switching means adapted to complete successively the said electric circuits through said generator so as to cause the successive operation of said two electro-magnetic switching devices.

22. Train protecting apparatus comprising danger-indicating apparatus and line-clear indicating apparatus located on a train, two contacting devices on said train, two series of track contacts arranged along a railway track and adapted to produce the operation of said danger-indicating apparatus and of said line-clear indicating apparatus respectively, the track contacts of each series being adapted to come into contact with one of said contacting devices, electric circuits controlling the operation of said danger-indicating apparatus and of said line-clear indicating apparatus respectively and each arranged partly on the train and partly on the track and adapted to be completed by contact of a corresponding one of said contacting devices with a track contact, two electro-magnetic switching devices whose armatures when each is in a particular position complete the track portion of the circuit of the track contact of one of said series and when each is in another position complete the track portion of a circuit of the track contacts of the other of said series, a generator of electricity, switching means, an electric circuit for operating one of said electro-magnetic devices and adapted to be completed through said generator by said switching means, and a second electric circuit for operating the other of said electro-magnetic devices and adapted to be completed through said generator by contact of the armature of the first mentioned electro-magnetic device with a contact and by said switching means, said switching means being adapted to complete successively the said electric circuits in the order named so as to cause the successive operation of the said two electro-magnetic devices in a corresponding order.

23. Train protecting apparatus comprising indicating apparatus located on a train, a contacting device on a vehicle of said train, two series of track contacts arranged along a railway track and corresponding respectively to opposite directions of facing of said vehicle, said track contacts being adapted to come into contact with said contacting device, an electric circuit controlling the operation of said indicating apparatus and arranged partly on said train and partly on said track and adapted to be completed by contact of said contacting device with a track contact, two electromagnetic switching devices whose armatures when each is in a particular position complete the track portion of the circuit of a track contact of one of said series and when each is in another position complete the track portion of the circuit of the track contacts of the other of said series, electric circuits for operating each of said electro-magnetic switching devices, a generator of electricity, switching means adapted to complete successively the said electric circuits through said generator so as to cause the successive operation of said two electro-magnetic switching instruments, a device adapted to lock said switching means, an electro-magnetic device adapted when energized to unlock said switching means, and an electric circuit including the last mentioned electro-magnetic device and a generator of electricity, and a switching device and adapted to be completed by the operation of the last mentioned switching device.

24. Train protecting apparatus comprising danger indicating apparatus and line-clear indicating apparatus located on a train, two contacting devices on said train, two series of track contacts arranged along a railway track and adapted to produce the operation of said danger-indicating apparatus and of said line-clear indicating apparatus respectively, the track contacts of each series being adapted to come into contact with one of said contacting devices, electric circuits controlling the operation of said danger-indicating apparatus and of said line-clear indicating apparatus respectively and each arranged partly on the train and partly on the track and adapted to be completed by contact of a corresponding one of said contacting devices with a track contact, two electro-magnetic switching devices whose armatures when each is in a particular position complete the track portion of the circuit of the track contacts of one of said series and when each is in another position complete the track portion of the circuit of the track contacts of the other of said series, electric circuits for operating each of said electro-magnetic switching devices, a generator of electricity, switching means adapted to complete successively the said electric circuits through said generator so as to cause the successive operation of said two electro-magnetic switching instruments, a device adapted to lock said switching means, an electro-magnetic device adapted when energized to unlock said switching means, and an electric circuit including the last mentioned electro-magnetic device and a generator of electricity and a switching device and adapted to be completed by the operation of the last mentioned switching device.

25. Apparatus for the protection of trains comprising train stopping apparatus and warning apparatus located on a train, a movable contacting device located on a vehicle of said train, a set of track contacts of which one is adapted to give said device a displacement such as to cause it to produce the operation of said warning apparatus and another is adapted to give said device another displacement such as to cause it to produce the operation of said stopping apparatus, a line-clear intimating apparatus on said train, a second movable contacting device on said vehicle, a second set of track contacts which is similar to the first mentioned set and of which each contact is adapted to displace said second device so as to produce the operation of said line-clear intimating apparatus, the said devices and said sets of track contacts being so arranged on the vehicle and the track respectively that when said vehicle has been turned to face in the opposite direction the set of track contacts that has previously been adapted to give the first mentioned device said different displacements will be adapted to displace the second mentioned device and the set of track contacts that has previously been adapted to displace the second mentioned device will be adapted to give the first mentioned device said different displacements.

Signed at London, England, this 7th day of March, 1913.

ARTHUR REGINALD ANGUS.

Witnesses:
M. JOHN ARTHUR LAW,
FREDERICH LEOPOLD LEWIS.